US012212930B2

(12) United States Patent
Solum

(10) Patent No.: US 12,212,930 B2
(45) **Date of Patent: *Jan. 28, 2025**

(54) WIRELESS SYSTEM FOR HEARING COMMUNICATION DEVICES PROVIDING WIRELESS STEREO RECEPTION MODES

(71) Applicant: Starkey Laboratories, Inc., Eden Prairie, MN (US)

(72) Inventor: Jeffrey Paul Solum, Greenwood, MN (US)

(73) Assignee: Starkey Laboratories, Inc., Eden Prairie, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 18/452,340

(22) Filed: Aug. 18, 2023

(65) Prior Publication Data

US 2024/0137714 A1 Apr. 25, 2024
US 2024/0236588 A9 Jul. 11, 2024

Related U.S. Application Data

(60) Continuation of application No. 17/646,774, filed on Jan. 3, 2022, now Pat. No. 11,765,526, which is a (Continued)

(51) Int. Cl.

*H04R 25/00* (2006.01)
*H04R 5/04* (2006.01)

(Continued)

(52) U.S. Cl.

CPC ............ *H04R 25/552* (2013.01); *H04R 5/04* (2013.01); *H04R 25/554* (2013.01); *H04S 1/007* (2013.01);

(Continued)

(58) Field of Classification Search

CPC ...... H04R 5/04; H04R 25/554; H04R 1/1041; H04R 5/033; H04R 25/505; H04R 25/558;

(Continued)

(56) References Cited

U.S. PATENT DOCUMENTS

| | | | |
|---|---|---|---|
| 2,530,621 | A | 11/1950 | Lybarger |
| 2,554,834 | A | 5/1951 | Lavery |

(Continued)

FOREIGN PATENT DOCUMENTS

| | | |
|---|---|---|
| CH | 670349 A5 | 5/1989 |
| CH | 673551 A5 | 3/1990 |

(Continued)

OTHER PUBLICATIONS

US 8,175,281 B2, 05/2012, Edwards (withdrawn)

(Continued)

*Primary Examiner* — Tuan D Nguyen

(74) *Attorney, Agent, or Firm* — Schwegman Lundberg & Woessner, P.A.

(57) ABSTRACT

The present subject matter relates to the wireless stereo reception of first and second audio information by wireless hearing communication devices. One type of device which may employ the present subject matter is a hearing assistance device, such as a hearing aid. Various forms and protocols of signal transmission are employed in varying embodiments. The present subject matter includes various communication modes such as eavesdropping modes and relaying modes.

20 Claims, 3 Drawing Sheets

Related U.S. Application Data continuation of application No. 16/703,332, filed on Dec. 4, 2019, now Pat. No. 11,218,815, which is a division of application No. 15/851,953, filed on Dec. 22, 2017, now Pat. No. 10,511,918, which is a continuation of application No. 15/061,309, filed on Mar. 4, 2016, now Pat. No. 9,854,369, which is a continuation of application No. 13/970,368, filed on Aug. 19, 2013, now Pat. No. 9,282,416, which is a continuation of application No. 13/270,860, filed on Oct. 11, 2011, now Pat. No. 8,515,114, which is a continuation of application No. 11/619,541, filed on Jan. 3, 2007, now Pat. No. 8,041,066.

(51) Int. Cl.
*H04S 1/00* (2006.01)
*H04R 1/10* (2006.01)
*H04R 5/033* (2006.01)

(52) U.S. Cl.
CPC ............ *H04R 1/1041* (2013.01); *H04R 5/033* (2013.01); *H04R 25/505* (2013.01); *H04R 25/558* (2013.01); *H04R 2225/55* (2013.01); *H04R 2420/07* (2013.01)

(58) Field of Classification Search
CPC .............. H04R 25/552; H04R 2225/55; H04R 2420/07; H04S 1/007
See application file for complete search history.

(56) References Cited

U.S. PATENT DOCUMENTS 2,656,421 A 10/1953 Lybarger
3,396,245 A 8/1968 Flygstad
3,527,901 A 9/1970 Geib
3,571,514 A 3/1971 Wruk
3,660,695 A 5/1972 Schmitt
3,742,359 A 6/1973 Behymer
3,770,911 A 11/1973 Knowles et al.
3,798,390 A 3/1974 Gage et al.
3,836,732 A 9/1974 Johanson et al.
3,875,349 A 4/1975 Ruegg
3,894,196 A 7/1975 Briskey
3,946,168 A 3/1976 Preves
3,975,599 A 8/1976 Johanson
4,051,330 A 9/1977 Cole
4,142,072 A 2/1979 Berland
4,187,413 A 2/1980 Moser
4,366,349 A 12/1982 Adelman
4,395,601 A 7/1983 Kopke et al.
4,396,806 A 8/1983 Anderson
4,419,544 A 12/1983 Adelman
4,425,481 A 1/1984 Mansgold et al.
4,449,018 A 5/1984 Stanton
4,456,795 A 6/1984 Saito
4,467,145 A 8/1984 Borstel
4,471,490 A 9/1984 Bellafiore
4,489,330 A 12/1984 Marutake et al.
4,490,585 A 12/1984 Tanaka
4,508,940 A 4/1985 Steeger
4,596,899 A 6/1986 Wojcik et al.
4,622,440 A 11/1986 Slavin
4,631,419 A 12/1986 Sadamatsu et al.
4,637,402 A 1/1987 Adelman
4,638,125 A 1/1987 Buettner
4,696,032 A 9/1987 Levy
4,710,961 A 12/1987 Buttner
4,712,244 A 12/1987 Zwicker et al.
4,723,293 A 2/1988 Harless
4,751,738 A 6/1988 Widrow et al.
4,756,312 A 7/1988 Epley
4,764,957 A 8/1988 Angelini et al.
4,845,755 A 7/1989 Busch et al.
4,862,509 A 8/1989 Towsend
4,882,762 A 11/1989 Waldhauer
4,887,299 A 12/1989 Cummins et al.
4,926,464 A 5/1990 Schley-May
4,930,156 A 5/1990 Norris
4,995,085 A 2/1991 Kern et al.
5,010,575 A 4/1991 Marutake et al.
5,027,410 A 6/1991 Williamson et al.
5,029,215 A 7/1991 Miller, II
5,083,312 A 1/1992 Newton et al.
5,086,464 A 2/1992 Groppe
5,091,952 A 2/1992 Williamson et al.
5,157,405 A 10/1992 Wycoff et al.
5,189,704 A 2/1993 Krauss
5,204,917 A 4/1993 Arndt et al.
5,212,827 A 5/1993 Meszko et al.
5,214,709 A 5/1993 Ribic
5,226,087 A 7/1993 Ono et al.
5,280,524 A 1/1994 Norris
5,289,544 A 2/1994 Franklin
5,390,254 A 2/1995 Adelman
5,404,407 A 4/1995 Weiss
5,422,628 A 6/1995 Rodgers
5,425,104 A 6/1995 Shennib
5,426,689 A 6/1995 Griffith et al.
5,434,924 A 7/1995 Jampolsky
5,463,692 A 10/1995 Fackler
5,479,522 A 12/1995 Lindemann et al.
5,483,599 A 1/1996 Zagorski
5,502,769 A 3/1996 Gilbertson
5,524,056 A 6/1996 Killion et al.
5,553,152 A 9/1996 Newton
5,581,747 A 12/1996 Anderson
5,600,728 A 2/1997 Satre
5,629,985 A 5/1997 Thompson
5,636,285 A 6/1997 Sauer
5,640,293 A 6/1997 Dawes et al.
5,640,457 A 6/1997 Gnecco et al.
5,651,071 A 7/1997 Lindemann et al.
5,659,621 A 8/1997 Newton
5,687,242 A 11/1997 Iburg
5,706,351 A 1/1998 Weinfurtner
5,710,820 A 1/1998 Martin et al.
5,721,783 A 2/1998 Anderson
5,734,976 A 3/1998 Bartschi et al.
5,737,430 A 4/1998 Widrow
5,740,257 A 4/1998 Marcus
5,751,820 A 5/1998 Taenzer
5,757,932 A 5/1998 Lindemann et al.
5,757,933 A 5/1998 Preves et al.
5,761,319 A 6/1998 Dar et al.
5,768,397 A 6/1998 Fazio
5,793,875 A 8/1998 Lehr et al.
5,796,848 A 8/1998 Martin
5,798,390 A 8/1998 Weber et al.
5,809,151 A 9/1998 Husung
5,822,442 A 10/1998 Agnew et al.
5,823,610 A 10/1998 Ryan et al.
5,825,631 A 10/1998 Prchal
5,835,610 A 11/1998 Ishige et al.
5,835,611 A 11/1998 Kaiser et al.
5,852,668 A 12/1998 Ishige et al.
5,862,238 A 1/1999 Agnew et al.
5,956,330 A 9/1999 Kerns
5,966,639 A 10/1999 Goldberg et al.
5,991,419 A 11/1999 Brander
5,991,420 A 11/1999 Stern
6,021,207 A 2/2000 Puthuff et al.
6,031,922 A 2/2000 Tibbetts
6,031,923 A 2/2000 Gnecco et al.
6,041,129 A 3/2000 Adelman
6,067,445 A 5/2000 Gray et al.
6,078,675 A 6/2000 Bowen-Nielsen et al.
6,078,825 A 6/2000 Hahn et al.
6,088,339 A 7/2000 Meyer
6,101,258 A 8/2000 Killion et al.
6,104,821 A 8/2000 Husung
6,115,478 A 9/2000 Schneider

(56) References Cited

U.S. PATENT DOCUMENTS 6,118,877 A 9/2000 Lindemann et al.
6,144,748 A 11/2000 Kerns
6,148,087 A 11/2000 Martin
6,157,727 A 12/2000 Rueda
6,157,728 A 12/2000 Tong et al.
6,175,633 B1 1/2001 Morrill et al.
6,216,040 B1 4/2001 Harrison
6,230,029 B1 5/2001 Hahn et al.
6,236,731 B1 5/2001 Brennan et al.
6,240,192 B1 5/2001 Brennan et al.
6,240,194 B1 5/2001 De Koning
6,310,556 B1 10/2001 Green et al.
6,311,155 B1 10/2001 Vaudrey et al.
6,324,291 B1 11/2001 Weidner
6,327,370 B1 12/2001 Killion et al.
6,347,148 B1 2/2002 Brennan et al.
6,356,741 B1 3/2002 Bilotti et al.
6,366,863 B1 4/2002 Bye et al.
6,381,308 B1 4/2002 Cargo et al.
6,389,142 B1 5/2002 Hagen et al.
6,438,245 B1 8/2002 Taenzer et al.
6,449,662 B1 9/2002 Armitage
6,459,882 B1 10/2002 Palermo et al.
6,466,679 B1 10/2002 Husung
6,522,764 B1 2/2003 Bogeskov-Jensen
6,549,633 B1 4/2003 Westermann
6,633,645 B2 10/2003 Bren et al.
6,694,034 B2 2/2004 Julstrom et al.
6,760,457 B1 7/2004 Bren et al.
7,016,511 B1 3/2006 Shennib
7,062,223 B2 6/2006 Gerber et al.
7,075,903 B1 7/2006 Solum
7,099,486 B2 8/2006 Julstrom et al.
7,103,191 B1 9/2006 Killion
7,116,792 B1 10/2006 Taenzer et al.
7,139,404 B2 11/2006 Feeley et al.
7,142,814 B2 11/2006 Nassimi
7,149,552 B2 12/2006 Lair
7,162,381 B2 1/2007 Boor et al.
7,181,032 B2 2/2007 Jakob et al.
7,248,713 B2 7/2007 Bren et al.
7,257,372 B2 8/2007 Kaltenbach et al.
7,260,233 B2 8/2007 Svendsen et al.
7,317,997 B2 1/2008 Boor et al.
7,369,669 B2 5/2008 Hagen et al.
7,412,294 B1 8/2008 Woolfork
7,433,435 B2 10/2008 Nagaraja
7,447,325 B2 11/2008 Bren et al.
7,450,078 B2 11/2008 Knudsen et al.
7,519,194 B2 4/2009 Niederdrank et al.
7,529,565 B2 5/2009 Hilpisch et al.
7,561,707 B2 7/2009 Kornagel
7,590,253 B2 9/2009 Killion
7,596,237 B1 9/2009 Constantin
7,702,121 B2 4/2010 Husung et al.
7,778,432 B2 8/2010 Larsen
7,791,551 B2 9/2010 Platz
7,813,762 B2 10/2010 Sanguino et al.
7,822,217 B2 10/2010 Hagen et al.
8,041,062 B2 10/2011 Cohen et al.
8,041,066 B2 10/2011 Solum
8,169,938 B2 5/2012 Duchscher et al.
8,194,901 B2 6/2012 Alber et al.
8,208,642 B2 6/2012 Edwards
8,224,004 B2 7/2012 Baechler et al.
8,254,608 B2 8/2012 De Finis
8,280,086 B2 10/2012 Topholm
8,331,592 B2 12/2012 Wu et al.
8,340,331 B2 12/2012 Pansell et al.
8,380,320 B2 2/2013 Spital
8,515,114 B2 8/2013 Solum
8,548,180 B2 10/2013 Takagi et al.
8,559,663 B1 10/2013 Sacha et al.
8,588,443 B2 11/2013 Glatt et al.
8,712,083 B2 4/2014 Solum
8,737,653 B2 5/2014 Woods
8,804,988 B2 8/2014 Solum et al.
8,811,639 B2 8/2014 Solum et al.
8,891,793 B1 11/2014 Sacha et al.
9,036,823 B2 5/2015 Edwards et al.
9,204,227 B2 12/2015 Woods
9,282,416 B2 3/2016 Solum
9,402,142 B2 7/2016 Solum et al.
9,420,385 B2 8/2016 Solum et al.
9,420,387 B2 8/2016 Solum et al.
9,426,586 B2 8/2016 Solum et al.
9,510,111 B2 11/2016 Edwards
9,635,470 B2 4/2017 Solum
9,774,961 B2 9/2017 Solum et al.
9,854,369 B2 12/2017 Solum
10,051,385 B2 8/2018 Edwards
10,469,960 B2 11/2019 Edwards
10,484,804 B2 11/2019 Solum et al.
10,511,918 B2 12/2019 Solum
10,728,678 B2 7/2020 Edwards
11,064,302 B2 7/2021 Edwards
11,218,815 B2 1/2022 Solum
11,678,128 B2 6/2023 Edwards
11,765,526 B2 9/2023 Solum
2001/0007050 A1 7/2001 Adelman
2001/0007335 A1 7/2001 Tuttle et al.
2002/0006206 A1 1/2002 Scofield
2002/0030871 A1 3/2002 Anderson et al.
2002/0076073 A1 6/2002 Taenzer et al.
2002/0090099 A1 7/2002 Hwang
2002/0131614 A1 9/2002 Jakob et al.
2002/0132585 A1 9/2002 Palermo et al.
2002/0174340 A1 11/2002 Dick et al.
2002/0186857 A1 12/2002 Bren et al.
2003/0045283 A1 3/2003 Hagedoorn
2003/0059073 A1 3/2003 Bren et al.
2003/0059076 A1 3/2003 Martin
2003/0076974 A1 4/2003 Barthel et al.
2003/0078071 A1 4/2003 Uchiyama
2003/0083058 A1 5/2003 Mayer
2003/0133582 A1 7/2003 Niederdrank
2003/0149526 A1 8/2003 Zhou et al.
2003/0215106 A1 11/2003 Hagen et al.
2003/0231783 A1 12/2003 Kah
2004/0010181 A1 1/2004 Feeley et al.
2004/0037442 A1 2/2004 Nielsen et al.
2004/0052391 A1 3/2004 Bren et al.
2004/0052392 A1 3/2004 Sacha et al.
2004/0077387 A1 4/2004 Sayag et al.
2004/0136555 A1 7/2004 Enzmann
2004/0141628 A1 7/2004 Villaverde et al.
2004/0190739 A1 9/2004 Bachler et al.
2004/0193090 A1 9/2004 Lebel et al.
2004/0208333 A1 10/2004 Cheung et al.
2004/0234090 A1 11/2004 Berg
2004/0259585 A1 12/2004 Yitzchak et al.
2005/0008178 A1 1/2005 Joergensen et al.
2005/0058313 A1 3/2005 Victorian et al.
2005/0078844 A1 4/2005 Von Ilberg
2005/0099341 A1 5/2005 Zhang et al.
2005/0100182 A1 5/2005 Sykes et al.
2005/0111401 A1 5/2005 Terry
2005/0111682 A1 5/2005 Essabar et al.
2005/0160270 A1 7/2005 Golberg et al.
2005/0197061 A1 9/2005 Hundal
2005/0244024 A1 11/2005 Fischer et al.
2005/0249371 A1 11/2005 Vogt
2005/0283263 A1 12/2005 Eaton et al.
2006/0013420 A1 1/2006 Sacha
2006/0018497 A1 1/2006 Kornagel
2006/0039577 A1 2/2006 Sanguino et al.
2006/0044140 A1 3/2006 Berg
2006/0057973 A1 3/2006 Wikel et al.
2006/0067549 A1 3/2006 Puder et al.
2006/0067550 A1 3/2006 Puder et al.
2006/0068842 A1 3/2006 Sanguino et al.
2006/0093172 A1 5/2006 Ludvigsen et al.
2006/0193273 A1 8/2006 Passier et al.
2006/0193375 A1 8/2006 Lee

(56) References Cited

U.S. PATENT DOCUMENTS

| | | | |
|---|---|---|---|
| 2006/0198529 | A1 | 9/2006 | Kjems et al. |
| 2006/0205349 | A1 | 9/2006 | Passier et al. |
| 2006/0245611 | A1 | 11/2006 | Jorgensen et al. |
| 2006/0274747 | A1 | 12/2006 | Duchscher et al. |
| 2007/0004464 | A1 | 1/2007 | Lair et al. |
| 2007/0009123 | A1 | 1/2007 | Aschoff et al. |
| 2007/0009124 | A1 | 1/2007 | Larsen |
| 2007/0066297 | A1 | 3/2007 | Heidari-bateni |
| 2007/0080889 | A1 | 4/2007 | Zhang |
| 2007/0116308 | A1 | 5/2007 | Zurek et al. |
| 2007/0121975 | A1 | 5/2007 | Sacha et al. |
| 2007/0149261 | A1 | 6/2007 | Huddart |
| 2007/0230727 | A1 | 10/2007 | Sanguino et al. |
| 2007/0248237 | A1 | 10/2007 | Bren et al. |
| 2007/0269065 | A1 | 11/2007 | Kilsgaard |
| 2007/0274550 | A1 | 11/2007 | Baechler et al. |
| 2008/0008341 | A1 | 1/2008 | Edwards |
| 2008/0013769 | A1 | 1/2008 | Sacha et al. |
| 2008/0158432 | A1 | 7/2008 | Hwang et al. |
| 2008/0159548 | A1 | 7/2008 | Solum |
| 2008/0165829 | A1 | 7/2008 | Lee |
| 2008/0175421 | A1 | 7/2008 | Chizari |
| 2008/0186241 | A1 | 8/2008 | Christensen |
| 2008/0205664 | A1 | 8/2008 | Kim et al. |
| 2008/0232623 | A1 | 9/2008 | Solum et al. |
| 2008/0260180 | A1 | 10/2008 | Goldstien et al. |
| 2008/0272980 | A1 | 11/2008 | Adel et al. |
| 2008/0273727 | A1 | 11/2008 | Hagen et al. |
| 2008/0306745 | A1 | 12/2008 | Roy et al. |
| 2009/0010464 | A1 | 1/2009 | Kornagel |
| 2009/0058635 | A1 | 3/2009 | LaLonde et al. |
| 2009/0173443 | A1 | 7/2009 | Kozlak et al. |
| 2010/0148931 | A1 | 6/2010 | Pappu et al. |
| 2010/0195836 | A1 | 8/2010 | Platz |
| 2010/0208631 | A1 | 8/2010 | Zhang et al. |
| 2010/0239111 | A1 | 9/2010 | Karamuk et al. |
| 2010/0246865 | A1 | 9/2010 | Suurballe |
| 2010/0246866 | A1 | 9/2010 | Swain et al. |
| 2010/0303268 | A1 | 12/2010 | Frerking et al. |
| 2010/0304065 | A1 | 12/2010 | Tomantschger et al. |
| 2010/0321269 | A1 | 12/2010 | Ishibana et al. |
| 2011/0019830 | A1 | 1/2011 | Leibman et al. |
| 2011/0032071 | A1 | 2/2011 | Tondering |
| 2011/0051965 | A1 | 3/2011 | Beck et al. |
| 2011/0090837 | A1 | 4/2011 | Duchscher et al. |
| 2011/0150251 | A1 | 6/2011 | Solum et al. |
| 2011/0150252 | A1 | 6/2011 | Solum et al. |
| 2011/0150254 | A1 | 6/2011 | Solum et al. |
| 2011/0150255 | A1 | 6/2011 | Solum |
| 2011/0158442 | A1 | 6/2011 | Woods |
| 2011/0249836 | A1 | 10/2011 | Solum et al. |
| 2011/0249837 | A1 | 10/2011 | Galster et al. |
| 2011/0249842 | A1 | 10/2011 | Solum et al. |
| 2012/0093324 | A1 | 4/2012 | Sinasi |
| 2012/0121094 | A1 | 5/2012 | Solum |
| 2012/0163644 | A1 | 6/2012 | Xu et al. |
| 2012/0177235 | A1 | 7/2012 | Solum |
| 2012/0209101 | A1 | 8/2012 | Kidmose et al. |
| 2012/0308019 | A1 | 12/2012 | Edwards |
| 2012/0310395 | A1 | 12/2012 | El-hoiydi |
| 2013/0004002 | A1 | 1/2013 | Duchscher et al. |
| 2013/0017786 | A1 | 1/2013 | Kvist et al. |
| 2013/0114579 | A1 | 5/2013 | Vujcic |
| 2013/0308805 | A1 | 11/2013 | Ozden |
| 2013/0322493 | A1 | 12/2013 | Jersenius et al. |
| 2014/0023216 | A1 | 1/2014 | Solum et al. |
| 2014/0177885 | A1 | 6/2014 | Solum |
| 2014/0198937 | A1 | 7/2014 | Sacha et al. |
| 2014/0348359 | A1 | 11/2014 | Woods |
| 2015/0023513 | A1 | 1/2015 | Solum |
| 2015/0023539 | A1 | 1/2015 | Bauman |
| 2015/0036855 | A1 | 2/2015 | Solum et al. |
| 2015/0071469 | A1 | 3/2015 | Solum et al. |
| 2015/0172835 | A1 | 6/2015 | Sacha et al. |
| 2015/0256951 | A1 | 9/2015 | Edwards |
| 2016/0044426 | A1 | 2/2016 | Duchscher et al. |
| 2016/0080956 | A1 | 3/2016 | Hoole |
| 2016/0234612 | A1 | 8/2016 | Solum et al. |
| 2016/0323677 | A1 | 11/2016 | Solum |
| 2017/0041896 | A1 | 2/2017 | Solum et al. |
| 2017/0142528 | A1 | 5/2017 | Edwards |
| 2017/0238103 | A1 | 8/2017 | Gehring et al. |
| 2018/0014131 | A1 | 1/2018 | Solum et al. |
| 2018/0206048 | A1 | 7/2018 | Solum |
| 2018/0343527 | A1 | 11/2018 | Edwards |
| 2020/0068320 | A1 | 2/2020 | Edwards |
| 2020/0107140 | A1 | 4/2020 | Solum |
| 2020/0359140 | A1 | 11/2020 | Edwards |
| 2022/0007117 | A1 | 1/2022 | Edwards |
| 2022/0132253 | A1 | 4/2022 | Solum |
| 2024/0080634 | A1 | 3/2024 | Edwards |

FOREIGN PATENT DOCUMENTS

| | | | |
|---|---|---|---|
| CN | 1191060 | A | 8/1998 |
| CN | 101175342 | A | 5/2008 |
| CN | 102687533 | A | 9/2012 |
| CN | 101233786 | B | 5/2013 |
| CN | 107534819 | A | 1/2018 |
| DE | 2510731 | A1 | 9/1976 |
| DE | 3036417 | A1 | 5/1982 |
| DE | 3443907 | A1 | 6/1985 |
| DE | 10146886 | A1 | 4/2003 |
| EP | 0789474 | A2 | 8/1997 |
| EP | 0941014 | A2 | 9/1999 |
| EP | 0989775 | A1 | 3/2000 |
| EP | 1185138 | A2 | 3/2002 |
| EP | 1196008 | A2 | 4/2002 |
| EP | 1365628 | A2 | 11/2003 |
| EP | 1398995 | A2 | 3/2004 |
| EP | 1174003 | B1 | 7/2004 |
| EP | 1445982 | A1 | 8/2004 |
| EP | 1484942 | A2 | 12/2004 |
| EP | 1519625 | A2 | 3/2005 |
| EP | 1531650 | A | 5/2005 |
| EP | 1531650 | A2 | 5/2005 |
| EP | 1643801 | A2 | 4/2006 |
| EP | 1670283 | A1 | 6/2006 |
| EP | 1681903 | A2 | 7/2006 |
| EP | 1715718 | A2 | 10/2006 |
| EP | 1953934 | A1 | 8/2008 |
| EP | 1980132 | B1 | 10/2008 |
| EP | 2012557 | A2 | 1/2009 |
| EP | 2052758 | A1 | 4/2009 |
| EP | 1365628 | B1 | 12/2011 |
| EP | 2403273 | A1 | 1/2012 |
| EP | 2613566 | A1 | 7/2013 |
| EP | 1879426 | B1 | 8/2013 |
| EP | 2765650 | A1 | 8/2014 |
| EP | 2582158 | B1 | 8/2016 |
| FR | 2714561 | A1 | 6/1995 |
| JP | 918998 | A | 1/1997 |
| JP | 10084209 | | 3/1998 |
| JP | 201490467 | A | 5/2014 |
| KR | 101253799 | B1 | 4/2013 |
| WO | WO-9641498 | A1 | 12/1996 |
| WO | WO-1996014198 | A1 | 12/1996 |
| WO | WO-9848526 | A2 | 10/1998 |
| WO | WO-0021332 | A2 | 4/2000 |
| WO | WO-0022874 | A2 | 4/2000 |
| WO | WO-0158064 | A1 | 8/2001 |
| WO | WO-0167433 | A1 | 9/2001 |
| WO | WO-0203750 | A2 | 1/2002 |
| WO | WO-0209363 | A2 | 1/2002 |
| WO | WO-2002009363 | A2 | 1/2002 |
| WO | WO-0223950 | A2 | 3/2002 |
| WO | WO-04034738 | A1 | 4/2002 |
| WO | WO-02061957 | A2 | 8/2002 |
| WO | WO-03008013 | A2 | 1/2003 |
| WO | WO-2004100607 | A1 | 11/2004 |
| WO | WO-2004110099 | A | 12/2004 |
| WO | WO-2004110099 | A2 | 12/2004 |
| WO | WO-2005009072 | A2 | 1/2005 |
| WO | WO-2005061048 | A1 | 7/2005 |

(56) References Cited

FOREIGN PATENT DOCUMENTS

| | | | |
|---|---|---|---|
| WO | WO-2005101731 | A2 | 10/2005 |
| WO | WO-2006023857 | A1 | 3/2006 |
| WO | WO-2006023920 | A1 | 3/2006 |
| WO | WO-2006074655 | A1 | 7/2006 |
| WO | WO-2006078586 | A2 | 7/2006 |
| WO | WO-2006133158 | A1 | 12/2006 |
| WO | WO-2007068243 | A1 | 6/2007 |
| WO | WO-2008151624 | A1 | 12/2008 |
| WO | WO-2009063097 | A2 | 5/2009 |
| WO | WO-2009076949 | A1 | 6/2009 |
| WO | WO-2010033731 | A1 | 3/2010 |
| WO | WO-2012092973 | A1 | 7/2012 |
| WO | WO-2014184394 | A2 | 11/2014 |
| WO | WO-2014198323 | A1 | 12/2014 |
| WO | WO-2016130593 | A1 | 8/2016 |

OTHER PUBLICATIONS

"U.S. Appl. No. 10/146,536, Response filed Sep. 18, 2007 to Final Office Action dated Jun. 18, 2007", 24 pgs.
"U.S. Appl. No. 10/214,045, 312 Amendment filed Jun. 12, 2003", 6 pgs.
"U.S. Appl. No. 10/214,045, Non Final Office Action mailed Dec. 2, 2002", 7 pgs.
"U.S. Appl. No. 10/214,045, Notice of Allowance mailed Apr. 8, 2003", 17 pgs.
"U.S. Appl. No. 10/214,045, Response filed Apr. 2, 2003 to Non Final Office Action mailed Dec. 2, 2002", 8 pgs.
"U.S. Appl. No. 10/243,412, Examiner Interview Summary mailed Mar. 9, 2006", 7 pgs.
"U.S. Appl. No. 10/243,412, Final Office Action mailed Jan. 9, 2008", 6 pgs.
"U.S. Appl. No. 10/243,412, Non Final Office Action mailed May 17, 2007", 10 pgs.
"U.S. Appl. No. 10/243,412, Non Final Office Action mailed Jul. 28, 2006", 10 pgs.
"U.S. Appl. No. 10/243,412, Notice of Allowance mailed Jun. 30, 2008", 8 pgs.
"U.S. Appl. No. 10/243,412, Response filed Jan. 16, 2006 to Restriction Requirement mailed Dec. 16, 2005", 12 pgs.
"U.S. Appl. No. 10/243,412, Response filed May 9, 2008 to Non-Final Office Action mailed Jan. 9, 2008", 12 pgs.
"U.S. Appl. No. 10/243,412, Response filed Sep. 17, 2007 to Non Final Office Action mailed May 17, 2007", 15 pgs.
"U.S. Appl. No. 10/243,412, Response filed Dec. 28, 2006 to Non Final Office Action mailed Jul. 28, 2006", 16 pgs.
"U.S. Appl. No. 10/243,412, Restriction Requirement mailed Dec. 16, 2005", 5 pgs.
"U.S. Appl. No. 10/244,295, Final Office Action mailed May 24, 2007", 11 pgs.
"U.S. Appl. No. 10/244,295, Final Office Action mailed Aug. 11, 2006", 9 pgs.
"U.S. Appl. No. 10/244,295, Non Final Office Action mailed Feb. 3, 2006", 9 pgs.
"U.S. Appl. No. 10/244,295, Non Final Office Action mailed Mar. 11, 2005", 10 pgs.
"U.S. Appl. No. 10/244,295, Non Final Office Action mailed Nov. 29, 2006", 12 pgs.
"U.S. Appl. No. 10/244,295, Notice of Allowance mailed Aug. 7, 2007", 7 pgs.
"U.S. Appl. No. 10/244,295, Response filed Feb. 28, 2007 to Non Final Office Action mailed Nov. 29, 2006", 16 pgs.
"U.S. Appl. No. 10/244,295, Response filed May 3, 2020 to Non-Final Office Action mailed Feb. 3, 2006", 17 pgs.
"U.S. Appl. No. 10/244,295, Response filed Jun. 13, 2005 to Non-Final Office Action mailed Mar. 11, 2005", 20 pgs.
"U.S. Appl. No. 10/244,295, Response filed Jul. 24, 2007 to Final Office Action mailed May 24, 2007", 12 pgs.
"U.S. Appl. No. 10/244,295, Response filed Oct. 11, 2006 to Final Office Action mailed Aug. 11, 2006", 17 pgs.
"U.S. Appl. No. 10/284,877, Final Office Action mailed Jun. 14, 2006", 11 pgs.
"U.S. Appl. No. 10/284,877, Final Office Action mailed Nov. 14, 2006", 11 pgs.
"U.S. Appl. No. 10/284,877, Non Final Office Action mailed Mar. 25, 2005", 8 pgs.
"U.S. Appl. No. 10/284,877, Non Final Office Action mailed Dec. 1, 2005", 10 pgs.
"U.S. Appl. No. 10/284,877, Notice of Allowance mailed Mar. 22, 2007", 7 pgs.
"U.S. Appl. No. 10/284,877, Response filed Mar. 1, 2006 to Non Final Office Action mailed Dec. 1, 2005", 17 pgs.
"U.S. Appl. No. 10/284,877, Response filed Mar. 14, 2007 to Final Office Action mailed Nov. 14, 2006", 8 pgs.
"U.S. Appl. No. 10/284,877, Response filed Jun. 27, 2005 to Non Final Office Action mailed Mar. 25, 2005", 15 pgs.
"U.S. Appl. No. 10/284,877, Response filed Oct. 16, 2006 to Final Office Action mailed Jun. 14, 2006", 16 pgs.
"U.S. Appl. No. 11/207,555, Final Office Action mailed Jan. 22, 2009", 15 pgs.
"U.S. Appl. No. 11/207,555, Final Office Action mailed Feb. 4, 2010", 13 pgs.
"U.S. Appl. No. 11/207,555, Non-Final Office Action mailed Jun. 3, 2008", 12 pgs.
"U.S. Appl. No. 11/207,555, Non-Final Office Action mailed Jul. 16, 2009", 12 pgs.
"U.S. Appl. No. 11/207,555, Response filed Jun. 22, 2009 to Final Office Action mailed Jan. 22, 2009", 9 pgs.
"U.S. Appl. No. 11/207,555, Response filed Nov. 3, 2008 to Non Final Office Action mailed Jun. 3, 2008", 8 pgs.
"U.S. Appl. No. 11/207,555, Response filed Nov. 16, 2009 to Non-Final Office Action mailed Jul. 15, 2009", 8 pgs.
"U.S. Appl. No. 11/207,591, Final Office Action mailed Jan. 6, 2009", 13 pgs.
"U.S. Appl. No. 11/207,591, Final Office Action mailed Jan. 15, 2010", 13 pgs.
"U.S. Appl. No. 11/207,591, Non-Final Office Action mailed Jul. 14, 2009", 13 pgs.
"U.S. Appl. No. 11/207,591, Non-Final Office Action mailed Jul. 28, 2008", 11 pgs.
"U.S. Appl. No. 11/207,591, Non-Final Office Action mailed Nov. 16, 2007", 9 pgs.
"U.S. Appl. No. 11/207,591, Response filed May 6, 2008 to Non Final Office Action mailed Nov. 16, 2007", 8 pgs.
"U.S. Appl. No. 11/207,591, Response filed May 6, 2009 to Final Office Action mailed Jan. 6, 2009", 8 pgs.
"U.S. Appl. No. 11/207,591, Response filed Oct. 14, 2009 to Non Final Office Action mailed Jul. 14, 2009", 10 pgs.
"U.S. Appl. No. 11/207,591, Response filed Oct. 28, 2008 to Non Final Office Action mailed Jul. 28, 2008", 7 pgs.
"U.S. Appl. No. 11/207,591, Notice of Allowance mailed Jul. 1, 2010", 7 pgs.
"U.S. Appl. No. 11/207,591, Response filed Jun. 15, 2010 to Final Office Action mailed Jan. 15, 2010", 9 pgs.
"U.S. Appl. No. 11/447,617, Final Office Action mailed Mar. 3, 2010", 31 pgs.
"U.S. Appl. No. 11/447,617, Non Final Office Action mailed Aug. 31, 2011", 29 pgs.
"U.S. Appl. No. 11/447,617, Non-Final Office Action mailed Jun. 22, 2009", 25 pgs.
"U.S. Appl. No. 11/447,617, Notice of Allowance mailed Mar. 16, 2012", 8 pgs.
"U.S. Appl. No. 11/447,617, Response filed Feb. 29, 2012 to Non Final Office Action mailed Aug. 31, 2011", 13 pgs.
"U.S. Appl. No. 11/447,617, Response filed May 26, 2009 to Restriction Requirement mailed Apr. 24, 2009", 8 pgs.
"U.S. Appl. No. 11/447,617, Response filed Aug. 3, 2010 to Final Office Action mailed Mar. 3, 2010", 14 pgs.
"U.S. Appl. No. 11/447,617, Response filed Nov. 23, 2009 to Non Final Office Action mailed Jun. 22, 2009", 15 pgs.

(56) References Cited

OTHER PUBLICATIONS

"U.S. Appl. No. 11/447,617, Restriction Requirement mailed Apr. 24, 2009", 6 pgs.
"U.S. Appl. No. 11/456,538, Final Office Action mailed Mar. 3, 2011", 28 pgs.
"U.S. Appl. No. 11/456,538, Non-Final Office Action mailed Aug. 19, 2010", 25 Pgs.
"U.S. Appl. No. 11/456,538, Notice of Allowance mailed Apr. 5, 2012", 10 pgs.
"U.S. Appl. No. 11/456,538, Notice of Allowance mailed May 16, 2012", 10 pgs.
"U.S. Appl. No. 11/456,538, Notice of Allowance Mailed Dec. 19, 2011", 9 pgs.
"U.S. Appl. No. 11/456,538, Response filed Jan. 19, 2011 to Non Final Office Action mailed Aug. 19, 2010", 16 pgs.
"U.S. Appl. No. 11/456,538, Response filed Aug. 5, 2011 to Final Office Action mailed Mar. 3, 2011", 15 pgs.
"U.S. Appl. No. 11/619,541, Non Final Office Action mailed Dec. 21, 2010", 7 pgs.
"U.S. Appl. No. 11/619,541, Notice of Allowance mailed Jul. 5, 2011", 6 pgs.
"U.S. Appl. No. 11/619,541, Response filed May 23, 2011 to Non Final Office Action mailed Dec. 21, 2010", 10 pgs.
"U.S. Appl. No. 11/692,763, Non-Final Office Action mailed Jan. 21, 2010", 11 pgs.
"U.S. Appl. No. 11/692,763, Response filed Jun. 21, 2010 to Non Final Office Action mailed Jan. 21, 2010", 9 pgs.
"U.S. Appl. No. 12/115,423, Notice of Allowance mailed Sep. 15, 2010", 9 pgs.
"U.S. Appl. No. 12/643,540, Advisory Action mailed Sep. 25, 2014", 4 pgs.
"U.S. Appl. No. 12/643,540, Advisory Action mailed Sep. 26, 2013", 2 pgs.
"U.S. Appl. No. 12/643,540, Corrected Notice of Allowance mailed May 6, 2016", 2 pgs.
"U.S. Appl. No. 12/643,540, Final Office Action mailed Jun. 5, 2014", 17 pgs.
"U.S. Appl. No. 12/643,540, Final Office Action mailed Jun. 7, 2013", 13 pgs.
"U.S. Appl. No. 12/643,540, Final Office Action mailed Jul. 2, 2015", 22 pgs.
"U.S. Appl. No. 12/643,540, Non Final Office Action mailed Aug. 16, 2012", 14 pgs.
"U.S. Appl. No. 12/643,540, Non Final Office Action mailed Dec. 19, 2014", 17 pgs.
"U.S. Appl. No. 12/643,540, Non Final Office Action mailed Dec. 30, 2013", 15 pgs.
"U.S. Appl. No. 12/643,540, Notice of Allowance mailed Apr. 15, 2016", 10 pgs.
"U.S. Appl. No. 12/643,540, Response filed Jan. 16, 2013 to Non Final Office Action mailed Aug. 16, 2012", 8 pgs.
"U.S. Appl. No. 12/643,540, Response filed Mar. 31, 2014 to Non Final Office Action mailed Dec. 30, 2013", 7 pgs.
"U.S. Appl. No. 12/643,540, Response filed Apr. 20, 2015 to Non Final Office Action mailed Dec. 19, 2014", 8 pgs.
"U.S. Appl. No. 12/643,540, Response filed Sep. 5, 2014 to Final Office Action mailed Jun. 5, 2014", 8 pgs.
"U.S. Appl. No. 12/643,540, Response filed Sep. 6, 2013 to Final Officer Action mailed Jun. 7, 2013", 7 pgs.
"U.S. Appl. No. 12/643,540, Response filed Dec. 2, 2015 to Final Office Action mailed Jul. 2, 2015", 7 pgs.
"U.S. Appl. No. 12/649,648 , Response filed Jun. 5, 2013 to Non Final Office Action mailed Mar. 5, 2013", 9 pgs.
"U.S. Appl. No. 12/649,648 , Response filed Nov. 13, 2013 to Final Office Action mailed Sep. 13, 2013", 9 pgs.
"U.S. Appl. No. 12/649,648, Final Office Action mailed Sep. 13, 2013", 16 pgs.
"U.S. Appl. No. 12/649,648, Non Final Office Action mailed Mar. 5, 2013", 15 pgs.
"U.S. Appl. No. 12/649,648, Notice of Allowance mailed Nov. 22, 2013", 7 pgs.
"U.S. Appl. No. 12/776,038, Non Final Office Action mailed Sep. 27, 2012", 9 pgs.
"U.S. Appl. No. 12/776,038, Notice of Allowance mailed Jan. 18, 2013", 9 pgs.
"U.S. Appl. No. 12/776,038, Notice of Allowance mailed Jun. 10, 2013", 9 pgs.
"U.S. Appl. No. 12/776,038, Response filed Dec. 26, 2012 to Non Final Office Action mailed Sep. 27, 2012", 7 pgs.
"U.S. Appl. No. 12/823,505 , Response filed Feb. 4, 2014 to Non Final Office Action mailed Nov. 4, 2014", 8 pgs.
"U.S. Appl. No. 12/823,505 , Response filed Apr. 23, 2013 to Non Final Office Action mailed Jan. 23, 2013", 12 pgs.
"U.S. Appl. No. 12/823,505, Advisory Action mailed Oct. 4, 2013", 3 pgs.
"U.S. Appl. No. 12/823,505, Final Office Action mailed Apr. 29, 2014", 11 pgs.
"U.S. Appl. No. 12/823,505, Final Office Action mailed Jul. 18, 2013", 9 pgs.
"U.S. Appl. No. 12/823,505, Non Final Office Action mailed Jan. 23, 2013", 11 pgs.
"U.S. Appl. No. 12/823,505, Non Final Office Action mailed Nov. 4, 2013", 9 pgs.
"U.S. Appl. No. 12/823,505, Notice of Allowance mailed Jul. 18, 2014", 9 pgs.
"U.S. Appl. No. 12/823,505, Response filed Jun. 30, 2014 to Final Office Action mailed Apr. 29, 2014", 8 pgs.
"U.S. Appl. No. 12/823,505, Response filed Sep. 4, 2013 to Restriction Requirement mailed Aug. 2, 2013", 6 pgs.
"U.S. Appl. No. 12/823,505, Response filed Sep. 18, 2013 to Final Office Action mailed Jul. 18, 2013", 8 pgs.
"U.S. Appl. No. 12/823,505, Response filed Dec. 19, 2012 to Restriction Requirement mailed Oct. 19, 2012", 6 pgs.
"U.S. Appl. No. 12/823,505, Restriction Requirement mailed Aug. 2, 2012", 6 pgs.
"U.S. Appl. No. 12/823,505, Restriction Requirement mailed Oct. 19, 2012", 6 pgs.
"U.S. Appl. No. 12/830,892, Advisory Action mailed Sep. 15, 2014", 4 pgs.
"U.S. Appl. No. 12/830,892, Final Office Action mailed Apr. 1, 2013", 16 pgs.
"U.S. Appl. No. 12/830,892, Final Office Action mailed Jun. 13, 2014", 17 pgs.
"U.S. Appl. No. 12/830,892, Final Office Action mailed Jul. 6, 2015", 23 pgs.
"U.S. Appl. No. 12/830,892, Non Final Office Action mailed Jan. 29, 2015", 19 pgs.
"U.S. Appl. No. 12/830,892, Non Final Office Action mailed Aug. 17, 2012", 15 pgs.
"U.S. Appl. No. 12/830,892, Non Final Office Action mailed Dec. 20, 2013", 15 pgs.
"U.S. Appl. No. 12/830,892, Notice of Allowance mailed Apr. 8, 2016", 10 pgs.
"U.S. Appl. No. 12/830,892, Response filed Jan. 16, 2013 to Non Final Office Action mailed Aug. 17, 2012", 8 pgs.
"U.S. Appl. No. 12/830,892, Response filed Mar. 20, 2014 to Non Final Office Action mailed Dec. 20, 2013", 7 pgs.
"U.S. Appl. No. 12/830,892, Response filed Apr. 29, 2015 to Non Final Office Action mailed Jan. 29, 2015", 8 pgs.
"U.S. Appl. No. 12/830,892, Response filed Jul. 1, 2013 to Final Office Action mailed Apr. 1, 2013", 9 pgs.
"U.S. Appl. No. 12/830,892, Response filed Aug. 13, 2014 to Final Office Action mailed Jun. 13, 2014", 8 pgs.
"U.S. Appl. No. 12/830,892, Response filed Nov. 6, 2015 to Final Office Action mailed Jul. 6, 2015", 7 pgs.
"U.S. Appl. No. 12/980,696, Non Final Office Action mailed Apr. 20, 2011", 7 pgs.
"U.S. Appl. No. 12/981,035, Advisory Action mailed Jul. 11, 2013", 3 pgs.
"U.S. Appl. No. 12/981,035, Final Office Action mailed Jan. 15, 2014", 17 pgs.

(56) References Cited

OTHER PUBLICATIONS

"U.S. Appl. No. 12/981,035, Final Office Action mailed Apr. 8, 2013", 17 pgs.
"U.S. Appl. No. 12/981,035, Non Final Office Action mailed Aug. 29, 2013", 17 pgs.
"U.S. Appl. No. 12/981,035, Non Final Office Action mailed Nov. 20, 2012", 16 pgs.
"U.S. Appl. No. 12/981,035, Notice of Allowance mailed Apr. 1, 2014", 9 pgs.
"U.S. Appl. No. 12/981,035, Response filed Feb. 20, 2013 to Non Final Office Action mailed Nov. 30, 2012", 7 pgs.
"U.S. Appl. No. 12/981,035, Response filed Mar. 17, 2014 to Final Office Action mailed Jan. 15, 2014", 8 pgs.
"U.S. Appl. No. 12/981,035, Response filed Jun. 10, 2013 to Final Office Action mailed Apr. 8, 2013", 7 pgs.
"U.S. Appl. No. 12/981,035, Response filed Nov. 27, 2013 to Non Final Office Action mailed Aug. 29, 2013", 7 pgs.
"U.S. Appl. No. 12/981,108, Advisory Action mailed Jun. 4, 2015", 6 pgs.
"U.S. Appl. No. 12/981,108, Advisory Action mailed Oct. 1, 2013", 3 pgs.
"U.S. Appl. No. 12/981,108, Corrected Notice of Allowance mailed May 6, 2016", 2 pgs.
"U.S. Appl. No. 12/981,108, Final Office Action mailed Jun. 6, 2013", 11 pgs.
"U.S. Appl. No. 12/981,108, Final Office Action mailed Dec. 19, 2014", 17 pgs.
"U.S. Appl. No. 12/981,108, Non Final Office Action mailed Apr. 3, 2014", 13 pgs.
"U.S. Appl. No. 12/981,108, Non Final Office Action mailed Jul. 6, 2015", 23 pgs.
"U.S. Appl. No. 12/981,108, Non Final Office Action mailed Aug. 17, 2012", 10 pgs.
"U.S. Appl. No. 12/981,108, Notice of Allowance mailed Apr. 14, 2016", 11 pgs.
"U.S. Appl. No. 12/981,108, Response filed Jan. 16, 2013 to Non Final Office Action mailed Aug. 17, 2012", 8 pgs.
"U.S. Appl. No. 12/981,108, Response filed Apr. 20, 2015 to Final Offfice Aciton mailed Dec. 19, 2014", 8 pgs.
"U.S. Appl. No. 12/981,108, Response filed Jun. 19, 2015 to Advisory Action mailed Jun. 4, 2015", 8 pgs.
"U.S. Appl. No. 12/981,108, Response filed Aug. 13, 2014 to Non Final Office Action mailed Apr. 3, 2014", 7 pgs.
"U.S. Appl. No. 12/981,108, Response filed Sep. 6, 2013 to Final Office Action mailed Jun. 6, 2013", 7 pgs.
"U.S. Appl. No. 12/981,108, Response filed Dec. 4, 2015 to Non Final Office Action mailed Jul. 6, 2015", 8 pgs.
"U.S. Appl. No. 13/084,988, Corrected Notice of Allowability mailed Jun. 4, 2014", 6 pgs.
"U.S. Appl. No. 13/084,988, Corrected Notice of Allowance mailed May 21, 2014", 5 pgs.
"U.S. Appl. No. 13/084,988, Corrected Notice of Allowance mailed Jul. 8, 2014", 6 pgs.
"U.S. Appl. No. 13/084,988, Non Final Office Action mailed Jan. 17, 2013", 12 pgs.
"U.S. Appl. No. 13/084,988, Non Final Office Action mailed Oct. 8, 2013", 11 pgs.
"U.S. Appl. No. 13/084,988, Notice of Allowance mailed Apr. 11, 2014", 11 pgs.
"U.S. Appl. No. 13/084,988, Response filed Jan. 8, 2014 to Non Final Office Action mailed Oct. 8, 2013", 9 pgs.
"U.S. Appl. No. 13/084,988, Response filed Jun. 17, 2013 to Non Final Office Action mailed Jan. 17, 2013", 8 pgs.
"U.S. Appl. No. 13/253,550, Non Final Office Action mailed Aug. 8, 2013", 12 pgs.
"U.S. Appl. No. 13/253,550, Notice of Allowance mailed Dec. 11, 2013", 11 pgs.
"U.S. Appl. No. 13/253,550, Response filed Nov. 8, 2013 to Non Final Office Action mailed Aug. 8, 2013", 7 pgs.
"U.S. Appl. No. 13/270,860, Non Final Office Action mailed Dec. 18, 2012", 5 pgs.
"U.S. Appl. No. 13/270,860, Notice of Allowance mailed Apr. 17, 2013", 10 pgs.
"U.S. Appl. No. 13/270,860, Preliminary Amendment filed Jan. 27, 2012", 7 pgs.
"U.S. Appl. No. 13/270,860, Response filed Mar. 18, 2013 to Non Final Office Action mailed Dec. 18, 2012", 7 pgs.
"U.S. Appl. No. 13/458,304, Non Final Office Action mailed Mar. 3, 2015", 9 pgs.
"U.S. Appl. No. 13/458,304, Response filed Jul. 6, 2015 to Non Final Office Action mailed Mar. 3, 2015", 7 pgs.
"U.S. Appl. No. 13/464,419, Notice of Allowance mailed Jan. 16, 2015", 10 pgs.
"U.S. Appl. No. 13/464,419, Preliminary Amendment filed Apr. 25, 2014", 8 pgs.
"U.S. Appl. No. 13/551,215, Advisory Action mailed Apr. 10, 2015", 4 pgs.
"U.S. Appl. No. 13/551,215, Advisory Action mailed Jul. 20, 2016", 4 pgs.
"U.S. Appl. No. 13/551,215, Examiner Interview Summary mailed Jul. 20, 2016", 2 pgs.
"U.S. Appl. No. 13/551,215, Final Office Action mailed Feb. 8, 2017", 21 pgs.
"U.S. Appl. No. 13/551,215, Final Office Action mailed Apr. 7, 2016", 23 pgs.
"U.S. Appl. No. 13/551,215, Final Office Action mailed Dec. 3, 2014", 16 pgs.
"U.S. Appl. No. 13/551,215, Non Final Office Action mailed Apr. 24, 2014", 16 pgs.
"U.S. Appl. No. 13/551,215, Non Final Office Action mailed Sep. 25, 2015", 23 pgs.
"U.S. Appl. No. 13/551,215, Response filed Feb. 3, 2015 to Final Office Action mailed Dec. 3, 2014", 8 pgs.
"U.S. Appl. No. 13/551,215, Response filed Jun. 7, 2016 to Final Office Action mailed Apr. 7, 2016", 8 pgs.
"U.S. Appl. No. 13/551,215, Response filed Aug. 8, 2016 to Advisory Action mailed Jul. 20, 2016", 8 pgs.
"U.S. Appl. No. 13/551,215, Response filed Aug. 19, 2014 to Non Final Office Action mailed Apr. 24, 2014", 9 pgs.
"U.S. Appl. No. 13/551,215, Response filed Dec. 28, 2015 to Non Final Office Action mailed Sep. 25, 2015", 8 pgs.
"U.S. Appl. No. 13/946,675, Advisory Action mailed May 29, 2015", 5 pgs.
"U.S. Appl. No. 13/946,675, Final Office Action mailed Mar. 12, 2015", 21 pgs.
"U.S. Appl. No. 13/946,675, Non Final Office Action mailed Aug. 4, 2015", 24 pgs.
"U.S. Appl. No. 13/946,675, Non Final Office Action mailed Nov. 7, 2014", 19 pgs.
"U.S. Appl. No. 13/946,675, Preliminary Amendment filed Jun. 23, 2014", 3 pgs.
"U.S. Appl. No. 13/946,675, Response filed Feb. 9, 2015 to Non Final Office Action mailed Nov. 7, 2014", 8 pgs.
"U.S. Appl. No. 13/946,675, Response filed May 12, 2015 to Final Office Action mailed Mar. 12, 2015", 8 pgs.
"U.S. Appl. No. 13/946,675, Response filed Jul. 13, 2015 to Final Office Action mailed Mar. 12, 2015", 8 pgs.
"U.S. Appl. No. 13/970,368, Non Final Office Action mailed Jun. 17, 2015", 6 pgs.
"U.S. Appl. No. 13/970,368, Notice of Allowance mailed Oct. 29, 2015", 9 pgs.
"U.S. Appl. No. 13/970,368, Preliminary Amendment mailed Mar. 6, 2014", 6 pgs.
"U.S. Appl. No. 13/970,368, Response filed Sep. 16, 2015 to Non Final Office Action mailed Jul. 17, 2015", 15 pgs.
"U.S. Appl. No. 14/188,104, Final Office Action mailed May 14, 2015", 9 pgs.
"U.S. Appl. No. 14/188,104, Non Final Office Action mailed Nov. 10, 2014", 9 pgs.
"U.S. Appl. No. 14/188,104, Notice of Allowance mailed Jul. 27, 2015", 6 pgs.

(56) References Cited

OTHER PUBLICATIONS

"U.S. Appl. No. 14/188,104, Response filed Feb. 10, 2015 to Non Final Office Action mailed Nov. 10, 2014", 6 pgs.
"U.S. Appl. No. 14/188,104, Response filed Jul. 13, 2015 to Final Office Action mailed May 14, 2015", 7 pgs.
"U.S. Appl. No. 14/262,983, Advisory Action mailed Sep. 30, 2016", 3 pgs.
"U.S. Appl. No. 14/262,983, Examiner Interview Summary mailed Dec. 15, 2016", 2 pgs.
"U.S. Appl. No. 14/262,983, Final Office Action mailed Jul. 13, 2016", 28 pgs.
"U.S. Appl. No. 14/262,983, Non Final Office Action mailed Oct. 2, 2015", 20 pgs.
"U.S. Appl. No. 14/262,983, Notice of Allowance mailed Dec. 22, 2016", 11 pgs.
"U.S. Appl. No. 14/262,983, Response filed Jan. 4, 2016 to Non Final Office Action mailed Oct. 2, 2015", 8 pgs.
"U.S. Appl. No. 14/262,983, Response filed Sep. 13, 2016 to Final Office Action mailed Jul. 13, 2016", 8 pgs.
"U.S. Appl. No. 14/452,625, Advisory Action mailed Jul. 12, 2017", 3 pgs.
"U.S. Appl. No. 14/452,625, Advisory Action mailed Sep. 15, 2016", 4 pgs.
"U.S. Appl. No. 14/452,625, Advisory Action mailed Nov. 30, 2015", 4 pgs.
"U.S. Appl. No. 14/452,625, Examiner Interview Summary mailed Sep. 15, 2016", 1 pg.
"U.S. Appl. No. 14/452,625, Final Office Action mailed Apr. 11, 2017", 20 pgs.
"U.S. Appl. No. 14/452,625, Final Office Action mailed Jun. 13, 2016", 20 pgs.
"U.S. Appl. No. 14/452,625, Final Office Action mailed Aug. 21, 2015", 17 pgs.
"U.S. Appl. No. 14/452,625, Non Final Office Action mailed Jan. 12, 2016", 19 pgs.
"U.S. Appl. No. 14/452,625, Non Final Office Action mailed Apr. 6, 2015", 15 pgs.
"U.S. Appl. No. 14/452,625, Non Final Office Action mailed Oct. 21, 2016", 18 pgs.
"U.S. Appl. No. 14/452,625, Preliminary Amendment filed Nov. 21, 2014", 8 pgs.
"U.S. Appl. No. 14/452,625, Response filed Jan. 20, 2017 to Non Final Office Action mailed Oct. 21, 2016", 7 pgs.
"U.S. Appl. No. 14/452,625, Response filed Apr. 12, 2016 to Non Final Office Action mailed Jan. 12, 2016", 7 pgs.
"U.S. Appl. No. 14/452,625, Response Filed Jun. 12, 2017 to Final Office Action mailed Apr. 11, 2017", 7 pgs.
"U.S. Appl. No. 14/452,625, Response filed Jul. 6, 2015 to Non Final Office Action mailed Apr. 6, 2015", 8 pgs.
"U.S. Appl. No. 14/452,625, Response filed Aug. 15, 2016 to Final Office Action mailed Jun. 13, 2016", 9 pgs.
"U.S. Appl. No. 14/452,625, Response filed Oct. 21, 2015 to Final Office Action mailed Aug. 21, 2015", 7 pgs.
"U.S. Appl. No. 14/462,010, Final Office Action mailed Dec. 2, 2015", 19 pgs.
"U.S. Appl. No. 14/462,010, Non Final Office Action mailed May 28, 2015", 8 pgs.
"U.S. Appl. No. 14/462,010, Notice of Allowance mailed Mar. 25, 2016", 12 pgs.
"U.S. Appl. No. 14/462,010, Response filed Mar. 2, 2016 to Final Office Action mailed Dec. 2, 2015", 10 pgs.
"U.S. Appl. No. 14/462,010, Response filed Aug. 27, 2015 to Non Final Office Action mailed May 28, 2015", 6 pgs.
"U.S. Appl. No. 14/543,173, Non Final Office Action mailed Aug. 25, 2015", 14 pgs.
"U.S. Appl. No. 14/543,173, Preliminary Amendment filed Jul. 13, 2015", 7 pgs.
"U.S. Appl. No. 14/714,792, Final Office Action mailed May 5, 2016", 7 pgs.
"U.S. Appl. No. 14/714,792, Non Final Office Action mailed Oct. 8, 2015", 6 pgs.
"U.S. Appl. No. 14/714,792, Notice of Allowance mailed Jul. 27, 2016", 9 pgs.
"U.S. Appl. No. 14/714,792, Response filed Jan. 7, 2016 to Non Final Office Action mailed Oct. 8, 2015", 7 pgs.
"U.S. Appl. No. 14/714,792, Response filed Jul. 5, 2016 to Final Office Action mailed May 5, 2016", 7 pgs.
"U.S. Appl. No. 14/920,446, Advisory Action mailed Aug. 15, 2017", 2 pgs.
"U.S. Appl. No. 14/920,446, Final Office Action mailed May 4, 2017", 9 pgs.
"U.S. Appl. No. 14/920,446, Non Final Office Action mailed Sep. 22, 2016", 8 pgs.
"U.S. Appl. No. 14/920,446, Respons Filed Aug. 4, 2017 to Final Office Action mailed May 4, 2017", 9 pgs.
"U.S. Appl. No. 14/920,446, Response filed Dec. 21, 2016 to Non Final Office Action mailed Sep. 22, 2016", 8 pgs.
"U.S. Appl. No. 15/019,895, Non Final Office Action mailed Dec. 29, 2016", 10 pgs.
"U.S. Appl. No. 15/019,895, Notice of Allowance mailed May 25, 2017", 13 pgs.
"U.S. Appl. No. 15/019,895, Notice of Allowance mailed May 25, 2017", 12 pgs.
"U.S. Appl. No. 15/019,895, Response filed Mar. 29, 2017 to Non Final Office Action mailed Dec. 29, 2017", 7 pgs.
"U.S. Appl. No. 15/061,309, Final Office Action mailed May 2, 2017", 7 pgs.
"U.S. Appl. No. 15/061,309, Non Final Office Action mailed Nov. 28, 2016", 7 pgs.
"U.S. Appl. No. 15/061,309, Notice of Allowability mailed Sep. 6, 2017", 2 pgs.
"U.S. Appl. No. 15/061,309, Notice of Allowability mailed Sep. 12, 2017", 2 pgs.
"U.S. Appl. No. 15/061,309, Preliminary Amendment filed Oct. 27, 2016", 6 pgs.
"U.S. Appl. No. 15/061,309, Response filed Aug. 1, 2017 to Final Office Action mailed May 2, 2017", 6 pgs.
"U.S. Appl. No. 15/061,309, Response flled Feb. 28, 2017 to Non Final Office Action mailed Nov. 28, 2016", 7 pgs.
"U.S. Appl. No. 15/236,978, Preliminary Amendment filed Oct. 26, 2016", 5 pgs.
"U.S. Appl. No. 15/362,447, Non Final Office Action mailed Dec. 1, 2017", 8 pgs.
"U.S. Appl. No. 15/362,447, Notice of Allowance mailed Apr. 11, 2018", 8 pgs.
"U.S. Appl. No. 15/362,447, Preliminary Amendment filed Feb. 6, 2017", 6 pgs.
"U.S. Appl. No. 15/362,447, Response Filed Feb. 20, 2018 to Non Final Office Action mailed Dec. 1, 2017", 7 pgs.
"U.S. Appl. No. 15/714,626, Advisory Action mailed Feb. 8, 2019", 3 pgs.
"U.S. Appl. No. 15/714,626, Final Office Action mailed Nov. 23, 2018", 16 pgs.
"U.S. Appl. No. 15/714,626, Non Final Office Action mailed Mar. 15, 2019", 13 pgs.
"U.S. Appl. No. 15/714,626, Non Final Office Action mailed Jun. 14, 2018", 15 pgs.
"U.S. Appl. No. 15/714,626, Notice of Allowability mailed Aug. 12, 2019", 2 pgs.
"U.S. Appl. No. 15/714,626, Notice of Allowance mailed Jul. 16, 2019", 9 pgs.
"U.S. Appl. No. 15/714,626, Response Filed Jan. 22, 2019 to Final Office Action mailed Nov. 23, 2018", 9 pgs.
"U.S. Appl. No. 15/714,626, Response Filed Sep. 6, 2018 to Non Final Office Action mailed Jun. 14, 2018", 8 pgs.
"U.S. Appl. No. 15/715,626, Response filed Jun. 17, 2019 to Non-Final Office Action mailed Mar. 15, 2019", 8 pgs.
"U.S. Appl. No. 15/851,953, Non Final Office Action mailed Mar. 29, 2019", 14 pgs.
"U.S. Appl. No. 15/851,953, Notice of Allowance mailed Aug. 14, 2019", 10 pgs.

(56) References Cited

OTHER PUBLICATIONS

"U.S. Appl. No. 15/851,953, Preliminary Amendment filed Feb. 12, 2019", 5 pgs.
"U.S. Appl. No. 15/851,953, Preliminary Amendment filed Apr. 9, 2018", 7 pgs.
"U.S. Appl. No. 15/851,953, Response filed Jun. 27, 2019 to Non-Final Office Action mailed Mar. 29, 2019", 7 pgs.
"U.S. Appl. No. 15/851,953, Restriction Requirement mailed Dec. 13, 2018", 7 pgs.
"U.S. Appl. No. 15/851,953, Supplemental Preliminary Amendment filed Apr. 11, 2018", 6 pgs.
"U.S. Appl. No. 16/057,168, Non Final Office Action mailed Mar. 7, 2019", 10 pgs.
"U.S. Appl. No. 16/057,168, Notice of Allowance mailed Jun. 24, 2019", 11 pgs.
"U.S. Appl. No. 16/057,168, Preliminary Amendment filed Apr. 14, 2006", 7 pgs.
"U.S. Appl. No. 16/057,168, Response filed Jun. 6, 2019 to Non Final Office Action mailed Mar. 7, 2019", 7 pgs.
"U.S. Appl. No. 16/670,332, Non Final Office Action mailed Nov. 29, 2019", 8 pgs.
"U.S. Appl. No. 16/670,332, Notice of Allowance mailed Mar. 16, 2020", 8 pgs.
"U.S. Appl. No. 16/670,332, Preliminary Amendment filed Nov. 1, 2019", 6 pgs.
"U.S. Appl. No. 16/670,332, Response filed Feb. 21, 2020 Non Final Office Action mailed Nov. 29, 2019", 7 pgs.
"U.S. Appl. No. 16/703,332, Non Final Office Action mailed Apr. 2, 2021", 12 pgs.
"U.S. Appl. No. 16/703,332, Notice of Allowance mailed Aug. 26, 2021", 9 pgs.
"U.S. Appl. No. 16/703,332, Preliminary Amedment filed Dec. 5, 2019", 6pgs.
"U.S. Appl. No. 16/703,332, Response filed Jul. 2, 2021 to Non Final Office Action mailed Apr. 2, 2021", 6 pgs.
"U.S. Appl. No. 16/703,332, Supplemental Notice of Allowability mailed Dec. 1, 2021", 2 pgs.
"U.S. Appl. No. 16/939,965, Non Final Office Action mailed Oct. 26, 2020", 16 pgs.
"U.S. Appl. No. 16/939,965, Notice of Allowance mailed Mar. 11, 2021", 8 pgs.
"U.S. Appl. No. 16/939,965, Response filed Feb. 24, 2021 to Non Final Office Action mailed Oct. 26, 2020", 7 pgs.
"U.S. Appl. No. 17/372,756, Non Final Office Action mailed Oct. 6, 2022", 25 pgs.
"U.S. Appl. No. 17/372,756, Notice of Allowance mailed Feb. 1, 2023", 8 pgs.
"U.S. Appl. No. 17/372,756, Preliminary Amendment filed Sep. 23, 2021", 6 pgs.
"U.S. Appl. No. 17/372,756, Response filed Jan. 3, 2023 to Non Final Office Action mailed Oct. 6, 2022", 7 pgs.
"U.S. Appl. No. 17/646,774, Non Final Office Action mailed Jan. 5, 2023", 11 pgs.
"U.S. Appl. No. 17/646,774, Notice of Allowance mailed May 19, 2023", 9 pgs.
U.S. Appl. No. 15/019,895 U.S. Pat. No. 9,774,961, filed Feb. 9, 2016, Hearing Assistance Device Ear-To-Ear Communication Using an Intermediate Device.
U.S. Appl. No. 15/714,626 U.S. Pat. No. 10,484,804, filed Sep. 25, 2017, Hearing Assistance Device Ear-To-Ear Communication Using an Intermediate Device.
"3D Circuits-A-Laser", [Online]. Retrieved from the Internet: <http://www.a-laser.com/3dcircuits.html>, (2012), 5 pgs.
"U.S. Appl. No. 09/052,631, Final Office Action mailed Jul. 11, 2000", 8 pgs.
"U.S. Appl. No. 09/052,631, Final Office Action mailed Jul. 30, 2001", 5 pgs.
"U.S. Appl. No. 09/052,631, Non Final Office Action mailed Jan. 18, 2001", 6 pgs.
"U.S. Appl. No. 09/052,631, Non Final Office Action mailed Dec. 28, 1999", 10 pgs.
"U.S. Appl. No. 09/052,631, Notice of Allowance mailed Dec. 18, 2001", 6 pgs.
"U.S. Appl. No. 09/052,631, Response filed May 18, 2001 to Non Final Office Action mailed Jan. 18, 2001", 7 pgs.
"U.S. Appl. No. 09/052,631, Response filed Oct. 30, 2001 to Final Office Action mailed Jul. 30, 2001", 5 pgs.
"U.S. Appl. No. 09/052,631, Response filed Nov. 10, 2000 to Final Office Action mailed Jul. 11, 2000", 5 pgs.
"U.S. Appl. No. 09/659,214, Advisory Action mailed Jun. 2, 2003", 3 pgs.
"U.S. Appl. No. 09/659,214, Final Office Action mailed Feb. 14, 2003", 7 pgs.
"U.S. Appl. No. 09/659,214, Final Office Action mailed Mar. 19, 2003", 7 pgs.
"U.S. Appl. No. 09/659,214, Non Final Office Action mailed Jul. 18, 2003", 7 pgs.
"U.S. Appl. No. 09/659,214, Non Final Office Action mailed Sep. 6, 2002", 7 pgs.
"U.S. Appl. No. 09/659,214, Notice of Allowance mailed Feb. 10, 2004", 6 pgs.
"U.S. Appl. No. 09/659,214, Response filed May 19, 2003 to Final Office Action mailed Mar. 19, 2003", 9 pgs.
"U.S. Appl. No. 09/659,214, Response filed Oct. 24, 2003 to Non Final Office Action mailed Jul. 18, 2003", 9 pgs.
"U.S. Appl. No. 09/659,214, Response filed Nov. 12, 2002 to Non Final Office Action mailed Sep. 6, 2002", 10 pgs.
"U.S. Appl. No. 10/146,536, Advisory Action mailed Oct. 16, 2007", 5 pgs.
"U.S. Appl. No. 10/146,536, Final Office Action mailed May 18, 2007", 28 pgs.
"U.S. Appl. No. 10/146,536, Non-Final Office Action mailed Sep. 19, 2006", 26 pgs.
"U.S. Appl. No. 10/146,536, Non-Final Office Action mailed Dec. 16, 2005", 25 pgs.
"U.S. Appl. No. 10/146,536, Notice of Allowance mailed Dec. 27, 2007", 10 pgs.
"U.S. Appl. No. 10/146,536, Response filed Feb. 20, 2007 to Non-Final Office Action mailed Sep. 19, 2006", 20 pgs.
"U.S. Appl. No. 10/146,536, Response filed Jun. 16, 2006 to Non-Final Office Action mailed Dec. 16, 2005", 14 pgs.
"U.S. Appl. No. 10/146,536, Response filed Nov. 19, 2007 to Final Office Action mailed May 18, 2007", 19 pgs.
"U.S. Appl. No. 17/646,774, Preliminary Amendment filed Jan. 5, 2022", 5 pgs.
"U.S. Appl. No. 17/646,774, Response filed Apr. 4, 2023 to Non Final Office Action mailed Jan. 5, 2023", 6 pgs.
"U.S. Appl. No. 17/646,774, Supplemental Preliminary Amendment filed Aug. 2, 2022", 6 pgs.
"U.S. Appl. No. 18/313,111, Preliminary Amendment filed Nov. 22, 2023", 7 pgs.
"U.S. Appl. No. 15/019,895, Examiner Interview Summary mailed May 25, 2017", 1 pg.
"U.S. Appl. No. 15/061,309, Notice of Allowance mailed Aug. 25, 2017", 14 pgs.
"Canadian Application Serial No. 2,428,908, Office action mailed Mar. 15, 2007", 6 pgs.
"Canadian Application Serial No. 2,428,908, Office action mailed Nov. 4, 2008", 9 pgs.
"Canadian Application Serial No. 2,428,908, Response filed Sep. 17, 2007 to Office Action mailed Mar. 15, 2007", 25 pgs.
"Chinese Application Serial No. 2,609,979, Response filed Aug. 16, 2011 to Office Action mailed Apr. 12, 2011", w/English claims, 15 pgs.
"Chinese Application Serial No. 200680028085.8, Office Action mailed Apr. 12, 2011", w/English translation, 3 pgs.
"Chinese Application Serial No. 200680028085.8, Office Action mailed Sep. 30, 2011", w/English translation, 8 pgs.
"Chinese Application Serial No. 200680028085.8, Office Action mailed Jun. 29, 2012", w/English translation, 8 pgs.

(56) References Cited

OTHER PUBLICATIONS

"Chinese Application Serial No. 200680028085.8, Response filed Apr. 13, 2012 to Office Action mailed Sep. 30, 2011", w/English claims, 15 pgs.
"Chinese Application Serial No. 200680028085.8, Response filed Nov. 14, 2012 to Office Action mailed Jun. 29, 2012", w/English claims, 14 pgs.
"Chinese Application Serial No. 201680009281.4, Office Action mailed Jun. 20, 2019", W/English Translation, 16 pgs.
"European Application Serial No. 10252054.1, Extended Search Report mailed Sep. 14, 2012", 16 pgs.
"European Application Serial No. 03253052, Search Report mailed Nov. 24, 2005", 2 pgs.
"European Application Serial No. 03253052.9, Communication of Notice of Opposition mailed Sep. 24, 2012", 22 pgs.
"European Application Serial No. 03253052.9, Communication of Notice of Opposition mailed Oct. 23, 2012", 1 pgs.
"European Application Serial No. 03253052.9, EPO Brief Communication mailed Oct. 17, 2014", l6 pgs.
"European Application Serial No. 03253052.9, European Search Report mailed Nov. 24, 2005", 2 pgs.
"European Application Serial No. 03253052.9, Office Action mailed Mar. 26, 2009", 3 pgs.
"European Application Serial No. 03253052.9, Response filed May 2, 2013 to Notice of Opposition mailed Sep. 24, 2012", 36 pgs.
"European Application Serial No. 03253052.9, Response filed Oct. 5, 2009 to Office Action mailed Mar. 26, 2009", 25 pgs.
"European Application Serial No. 03253052.9, Summons to Attend Oral Proceedings Mailed Mar. 13, 2014", 7 pgs.
"European Application Serial No. 03253052.9, Written Submission filed Oct. 13, 2014", 12 pgs.
"European Application Serial No. 05790836.0, Office Action Mailed Jun. 4, 2009", 3 pgs.
"European Application Serial No. 05791651.2, Examiner Interview Summary mailed Mar. 28, 2012", 4 pgs.
"European Application Serial No. 05791651.2, Office Action mailed Mar. 15, 2011", 5 pgs.
"European Application Serial No. 05791651.2, Office Action Response Filed Jul. 7, 2011", 11 pgs.
"European Application Serial No. 05791651.2, Oral Proceedings mailed May 3, 2012", 3 pgs.
"European Application Serial No. 05791651.2, Summons to Attend Oral Proceedings mailed Jan. 20, 2012", 4 pgs.
"European Application Serial No. 05791651.2, Written Decision to Refuse mailed May 3, 2012", 17 pgs.
"European Application Serial No. 05791651.2, Written Submission filed Mar. 16, 2012", 51 pgs.
"European Application Serial No. 06772250.4, Communication Pursuant to Article 94(3) EPC mailed Sep. 17, 2015", 5 pgs.
"European Application Serial No. 06772250.4, Office Action mailed Oct. 18, 2012", 5 pgs.
"European Application Serial No. 06772250.4, Office Action mailed Dec. 22, 2010", 3 pgs.
"European Application Serial No. 06772250.4, Response filed Apr. 25, 2013 to Office Action mailed Oct. 2018, 12", 7 pgs.
"European Application Serial No. 06772250.4, Response filed Jun. 24, 2011 to Office Action mailed Dec. 22, 2010", 18 pgs.
"European Application Serial No. 07250920.1, Response filed Aug. 22, 2014 to European Extended Search Report mailed Jan. 23, 2014", 21 pgs.
"European Application Serial No. 07252582.7, Extended European Search Report mailed Apr. 4, 2008", 7 pgs.
"European Application Serial No. 07252582.7, Office Action Mailed Feb. 6, 2009", 2 pgs.
"European Application Serial No. 07252582.7, Office Action mailed Dec. 27, 2011", 4 pgs.
"European Application Serial No. 07252582.7, Response filed Apr. 20, 2011 to Office Action mailed Oct. 15, 2010", 4 pgs.
"European Application Serial No. 07252582.7, Response filed Apr. 27, 2012 to Office Action mailed Dec. 27, 2011", 3 pgs.
"European Application Serial No. 07252582.7, Response filed Aug. 11, 2009 to Office Communication mailed Feb. 6, 2009", 2 pgs.
"European Application Serial No. 07252582.7.0, Office Action mailed Oct. 15, 2010", 4 pgs.
"European Application Serial No. 07254947.0, Decision to refuse a European Patent application mailed Aug. 18, 2015", 57 pgs.
"European Application Serial No. 07254947.0, Extended European Search Report mailed Apr. 3, 2008", 6 pgs.
"European Application Serial No. 07254947.0, Office Action mailed Aug. 25, 2008", 1 pgs.
"European Application Serial No. 07254947.0, Office Action mailed Jan. 19, 2012", 5 pgs.
"European Application Serial No. 07254947.0, Office Action mailed Oct. 12, 2010", 4 pgs.
"European Application Serial No. 07254947.0, Reply filed May 18, 2015 to Summons to Attend Oral Proceedings mailed Nov. 7, 2014", 14 pgs.
"European Application Serial No. 07254947.0, Response filed Apr. 26, 2011 to Official Communication mailed Oct. 12, 2010", 11 pgs.
"European Application Serial No. 07254947.0, Response filed Jul. 20, 2012 to Examination Notification Art. 94(3) mailed Jan. 19, 2012", 9 pgs.
"European Application Serial No. 07254947.0, Response filed Feb. 28, 2009 to Official Communication mailed Aug. 25, 2008", 2 pgs.
"European Application Serial No. 07254947.0, Summons to Attend Oral Proceedings mailed Nov. 7, 2014", 3 pgs.
"European Application Serial No. 10252054.1, Response filed Apr. 17, 2013 to Extended European Search Report mailed Sep. 14, 2012", 23 pgs.
"European Application Serial No. 10252192.9, Examination Notification Art. 94(3) mailed Jul. 8, 2015", 5 pgs.
"European Application Serial No. 10252192.9, Extended European Search Report mailed Jan. 2, 2013", 8 pgs.
"European Application Serial No. 10252192.9, Response filed Jan. 18, 2016 to Examination Notification Art. 94(3) mailed Jul. 8, 2015", 16 pgs.
"European Application Serial No. 10252192.9, Response filed Jul. 18, 2013 to Extended European Search Report mailed Jan. 2, 2013", 23 pgs.
"European Application Serial No. 11184383.5, Summons to Attend Oral Proceedings mailed Aug. 29, 2013", 5 pgs.
"European Application Serial No. 11184383.5, Extended European Search Report mailed Jul. 31, 2012", 7 pgs.
"European Application Serial No. 11184383.5, Office Action mailed Mar. 8, 2013", 7 pgs.
"European Application Serial No. 11184383.5, Response filed Feb. 14, 2013 to Extended European Search Report mailed Jul. 31, 2012", 23 pgs.
"European Application Serial No. 11184383.5, Response filed Jul. 12, 2013 to Office Action mailed Mar. 8, 2013", 11 pgs.
"European Application Serial No. 11250442.8, Examination Notification Art. 94(3) mailed Mar. 25, 2015", 5 pgs.
"European Application Serial No. 11250442.8, Extended European Search Report mailed Aug. 18, 2011", 6 pgs.
"European Application Serial No. 11250442.8, Response filed Apr. 17, 2012 to Extended Search Report mailed Aug. 18, 2011", 28 pgs.
"European Application Serial No. 11250442.8, Response filed Jul. 30, 2015 to Examination Notification Art. 94(3) mailed Mar. 25, 2015", 11 pgs.
"European Application Serial No. 13150071.2, Extended European Search Report mailed Feb. 15, 2013", 7 pgs.
"European Application Serial No. 13150071.2, Response filed Oct. 17, 2013 to Extended European Search Report mailed Feb. 15, 2013", 23 pgs.
"European Application Serial No. 13176910.1, Communication Pursuant to Article 94(3) EPC mailed Nov. 29, 2016", 6 pgs.
"European Application Serial No. 13176910.1, Extended European Search Report mailed Jan. 23, 2014", 9 pgs.
"European Application Serial No. 13176910.1, Response filed Jun. 9, 2017 to Communication Pursuant to Article 94(3) EPC mailed Nov. 29, 2016", 8 pgs.
"European Application Serial No. 14177405.9, Extended European Search Report mailed Jan. 5, 2015", 7 pgs.

(56) References Cited

OTHER PUBLICATIONS

"European Application Serial No. 14177405.9, Response filed Jul. 21, 2015 to Extended European Search Report mailed Jan. 5, 2015", 11 pgs.
"European Application Serial No. 14187742.3, Communication Pursuant to Article 94(3) EPC mailed Oct. 12, 2016", 5 pgs.
"European Application Serial No. 14187742.3, Extended European Search Report mailed Dec. 1, 2014", 6 pgs.
"European Application Serial No. 14187742.3, Response filed Apr. 27, 2017 to Communication Pursuant to Article 94(3) EPC mailed Oct. 12, 2016", 23 pgs.
"European Application Serial No. 14187742.3, Response filed Jul. 14, 2015 to Extended European Search Report mailed Dec. 1, 2014", 36 pgs.
"European Application Serial No. 16709170.1, Response filed Apr. 3, 2018 to Office Action mailed Sep. 20, 2017", 42 pgs.
"European Application Serial No. 17198644.1, Extended European Search Report mailed Feb. 15, 2018", 8 pgs.
"Hearing Aids—Part 12: Dimensions of electrical connector systems", IEC 118-12, (1996), 24 pgs.
"Hearing Aids—Part 6: Characteristics of electrical input circuits for hearing aids", IEC 60118-6, (1999), 12 pgs.
"Impedance-matching devices, L-section and Transmission lines", Wikipedia, Sections, [Online] retrieved from the internet: <https://en.wikipedia.org/wiki/Impedance_matching>, (Accessed Date- Feb. 14, 2017), 13 pgs.
"International Application Serial No. PCT/US2005/029793, International Preliminary Report on Patentability mailed Mar. 1, 2007", 5 pgs.
"International Application Serial No. PCT/US2005/029793, International Search Report mailed Jan. 5, 2006", 7 pgs.
"International Application Serial No. PCT/US2005/029793, Written Opinion mailed Jan. 5, 2006", 4 pgs.
"International Application Serial No. PCT/US2005/029971, International Preliminary Report on Patentability mailed Mar. 1, 2007", 6 pgs.
"International Application Serial No. PCT/US2005/029971, International Search Report mailed Jan. 5, 2006", 7 pgs.
"International Application Serial No. PCT/US2005/029971, Written Opinion mailed Jan. 5, 2006", 4 pgs.
"International Application Serial No. PCT/US2006/021870, International Preliminary Report on Patentability mailed Dec. 6, 2007", 8 pgs.
"International Application Serial No. PCT/US2006/021870, International Search Report and Written Opinion mailed Nov. 3, 2006", 13 pgs.
"International Application Serial No. PCT/US2016/017214, International Preliminary Report on Patentability mailed Aug. 24, 2017", 9 pgs.
"International Application Serial No. PCT/US2016/017214, International Search Report mailed Jun. 10, 2016", 4 pgs.
"International Application Serial No. PCT/US2016/017214, Written Opinion mailed Jun. 10, 2016", 7 pgs.
"Kleer Announces Reference Design for Wireless Earphones", [Online]. Retrieved from the Internet: <URL:http://kleer.com/newsevents/press_releases/prjan2.php>, (Jan. 2, 2007), 2 pgs.
"Korean Application Serial No. 10-2008-7000332, Office Action mailed Aug. 15, 2012", w/English translation, 9 pgs.
"Korean Application Serial No. 10-2008-7000332, Response filed Oct. 15, 2012 to Office Action mailed Aug. 15, 2012", w/English claims, 22 pgs.
"Korean Application Serial No. 10-2008-7000332, Voluntary Amendment filed Jun. 9, 2011", w/ English Translation, 14 pgs.
"Technical Data Sheet—Microphone Unit 6903", Published by Microtronic, (Dec. 2000), 2 pgs.
Beck, L. B., "The "T" Switch; Some Tips for Effective Use", Shhh, (Jan./Feb. 1989), 12-15.
Birger, Kollmeier, et al., "Real-time multiband dynamic compression and noise reduction for binaural hearing aids", Journal of Rehabilitation Research and Developement, vol. 30, No. 1, (Jan. 1, 1993), 82-94.
Davis, A., et al., "Magnitude of Diotic Summation in Speech-in-Noise Tasks: Performance Region and Appropriate Baseline", British Journal of Audiology, 24, (1990), 11-16.
Gilmore, R., "Telecoils: past, present & future", Hearing Instruments, 44 (2), (1993), 22-23, 26-27, 40.
Greefkes, J. A, et al., "Code Modulation with Digitally Controlled Companding for Speech Transmission", Philips Tech. Rev., 31(11/12), (1970), 335-353.
Griffing, Terry S, et al., "Acoustical Efficiency of Canal ITE Aids", Audecibel, (1983), 30-31.
Griffing, Terry S, et al., "Custom canal and mini in-the-ear hearing aids", Hearing Instruments, vol. 34, No. 2, (Feb. 1983), 31-32.
Griffing, Terry S, et al., "How to evaluate, sell, fit and modify canal aids", Hearing Instruments, vol. 35, No. 2, (Feb. 1984), 3 pgs.
Haartsen, J., "Bluetooth-The Universal Radio Interface for Ad Hoc, Wireless Connectivity", Ericsson Review, No. 3, (1998), 110-117.
Halverson, H. M., "Diotic Tonal vols. as a Function of Difference of Phase", The American Journal of Psychology, 33(4), (Oct. 1922), 526-534.
Hansaton Akustik GMBH, "48 K-AMP Contactmatic", (from Service Manual), (Apr. 1996), 8 pgs.
Lacanette, Kerry, "A Basic Introduction to Filters—Active, Passive, and Switched-Capacitor", National Semiconductor Corporation, http://www.swarthmore.edu/NatSci/echeeve1/Ref/DataSheet/Inttofilters.pdf, (Apr. 1991), 1-22.
Lindemann, "Two microphone nonlinear frequency domain beamformer for hearing aid noise reduction", IEEE ASSP Workshop on Applications of Signal Processing to Audio and Acoustics, (Oct. 1995), 24-27.
Lindemann, Eric, "Two Microphone Nonlinear Frequency Domain Beamformer for Hearing Aid Noise Reduction", Proc. IEEE Workshop on Applications of Signal Processing to Audio and Acoustics, (1995), 24-27.
Liu, Tao, et al., "Performance Evaluation of Link Quality Estimation Metrics for Static Multihop Wireless Sensor Networks", Mesh and Ad Hoc Communications and Networks Secon '09. 6TH Annual IEEE Communications Society Conference On, IEEE, Piscataway, (Jun. 22, 2009), 1-9.
Lybarger, S. F, "Development of a New Hearing Aid with Magnetic Microphone", Electrical Manufacturing, (Nov. 1947), 11 pgs.
Mahon, William J, "Hearing Aids Get a Presidential Endorsement", The Hearing Journal, (Oct. 1983), 7-8.
Olivier, Roy, "Distributed Signal Processing for Binaural Hearing Aid", [Online]. Retrieved from Internet :<http://infoscience.epfl.ch/record/126277/files/EPFL TH4220.pdf?version=1>, (Jan. 1, 2008), 1-143.
Olivier, Roy, et al., "Rate-Constrained Collaborative Noise Reduction for Wireless Hearing Aid", IEEE Transactions on signal Processing, IEEE Service center, New York, NY, US, vol. 57, No. 2, (Feb. 1, 2009), 645-657.
Peissig, J., et al., "Directivity of binaural noise reduction in spatial multiple noise-source arrangements for normal and impaired listeners", J Acoust Soc Am., 101(3), (Mar., 1997), 1660-70.
Preves, D. A., "A Look at the Telecoil—It's Development and Potential", SHHH Journal, (Sep./Oct. 1994), 7-10.
Preves, David A., "Field Trial Evaluations of a Switched Directional/Omnidirectional In-the-Ear Hearing Instrument", Journal of the American Academy of Audiology, 10(5), (May 1999), 273-283.
Schaefer, Conrad, "Letter referencing Micro Ear Patent", (Aug. 22, 2002), 2 pgs.
Srinivasan, S., "Low-bandwidth binaural beamforming", IEEE Electronics Letters, 44(22), (Oct. 23, 2008), 1292-1293.
Srinivasan, Sriram, et al., "Beamforming under Quantization Errors in Wireless Binaural Hearing Aids", EURASIP Journal on Audio, Speech, and Music Processing, vol. 2008, Article ID 824797, (Jan. 28, 2008), 8 pgs.
Sullivan, Roy F, "Custom canal and concha hearing instruments: A real ear comparison Part I", Hearing Instruments, vol. 40, No. 4, (Jul. 1989), 23-29.

(56) References Cited

OTHER PUBLICATIONS

Sullivan, Roy F, "Custom canal and concha hearing instruments: A real ear comparison Part II", Hearing Instruments, vol. 40, No. 7, (Jul. 1989), 30-36.
Teder, Harry, "Something New In CROS", Hearing Instruments, vol. 27, No. 9, Published by Harcourt Brace Jovanovich, (Sep. 1976), 18-19.
Valente, Michael, et al., "Audiology: Treatment", Thieme Medical Publishers, (Mar. 1, 2000), 594-599.
Vivek, Goyal K, "Theoretical Foundations of Transform Coding", IEEE Single Processing Magazine, IEEE Service center, Piscataway, NJ, US, vol. 18, No. 5, (Sep. 1, 2001), 9-21.
Zelnick, E., "The Importance of Interaural Auditory Differences in Binaural Hearing", Binaural Hearing and Amplification, vol. 1, (1980), 81-103.

WIRELESS SYSTEM FOR HEARING COMMUNICATION DEVICES PROVIDING WIRELESS STEREO RECEPTION MODES

RELATED APPLICATION

This application is a continuation of U.S. patent application Ser. No. 17/646,774, filed Jan. 3, 2022, which is a continuation of U.S. patent application Ser. No. 16/703,332, filed Dec. 4, 2019, now issued as U.S. Pat. No. 11,218,815; which is a divisional of U.S. patent application Ser. No. 15/851,953, filed Dec. 22, 2017, now issued as U.S. Pat. No. 10,511,918, which is a continuation of U.S. patent application Ser. No. 15/061,309, filed Mar. 4, 2016, now issued as U.S. Pat. No. 9,854,369, which is a continuation of U.S. patent application Ser. No. 13/970,368, filed Aug. 19, 2013, now issued as U.S. Pat. No. 9,282,416, which is a continuation of U.S. patent application Ser. No. 13/270,860, filed Oct. 11, 2011, now issued as U.S. Pat. No. 8,515,114, which is a continuation of U.S. patent application Ser. No. 11/619,541, filed Jan. 3, 2007, now issued as U.S. Pat. No. 8,041,066, all of which are incorporated herein by reference in their entirety.

FIELD OF THE INVENTION

This application relates generally to hearing communication devices, and more particularly to a wireless system for hearing communication devices providing wireless stereo reception modes.

BACKGROUND

Modern hearing communication devices that offer stereo reception typically require a wire between the left and right devices. For example, wireless stereo headsets generally include a stereo receiver and a wired connection to feed both the left and right speakers with the stereo connection. Such devices are not readily applied to other hearing communication devices, such as hearing aids. This is in part because wires are inconvenient, prone to breakage and can be less aesthetically pleasing to users who wish to conceal or downplay their use of hearing aids or other hearing communication devices.

Thus, there is a need in the art for an inconspicuous, robust, and elegant system for communicating stereo information to a wearer of hearing communication devices. The system should be convenient to use and to manufacture.

SUMMARY

This application addresses the foregoing needs in the art and other needs not discussed herein. The various embodiments described herein relate to wireless systems for hearing communication devices providing wireless stereo reception modes.

The present subject matter relates to the wireless stereo reception of first and second audio information by hearing communication devices. One type of device which may employ the present subject matter is a hearing aid. Various forms and protocols of signal transmission are employed in varying embodiments. The present subject matter includes various communication modes such as eavesdropping modes and relaying modes.

This Summary is an overview of some of the teachings of the present application and not intended to be an exclusive or exhaustive treatment of the present subject matter. Further details about the present subject matter are found in the detailed description and appended claims.

BRIEF DESCRIPTION OF THE DRAWINGS

Various embodiments are illustrated by way of example in the figures of the accompanying drawings.

DETAILED DESCRIPTION

In the following detailed description specific details are set forth to generally demonstrate various embodiments of the invention and to allow one of skill in the art to make and use the invention in its various forms. Thus, the following detailed description is not intended to provide an exclusive or exhaustive treatment of the present subject matter.

It should be noted that references to “an”, “one”, or “various” embodiments in this disclosure are not necessarily to the same embodiment, and such references contemplate more than one embodiment.

Figure 1:
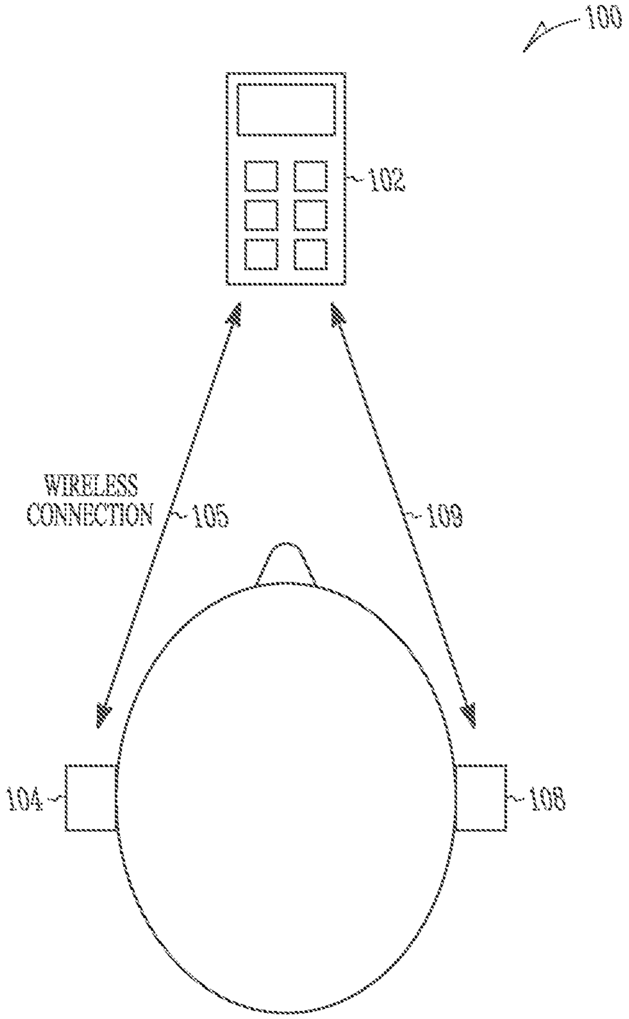
FIG. 1 shows one system using wireless devices in a direct communication mode according to one embodiment of the present subject matter.

FIG. 1 shows one system 100 using wireless devices in a direct communication mode with a remote source 102 according to one embodiment of the present subject matter. Remote source 102 transmits signals 105 to the first hearing communication device 104 including first audio information. Remote source 102 also transmits signals 109 to the second hearing communication device 108 including second audio information. In this embodiment, the first hearing communication device 104 does not have a wireless connection to the second hearing communication device 108 for transmitting stereo information from the first hearing communication device 104 to the second hearing communication device 108. Thus, the first audio information is wirelessly received by the first hearing communication device 104 and played to a first ear of the wearer and the second audio information is wirelessly received by the second hearing communication device 108 and played to the second ear of the wearer.

Figure 2:
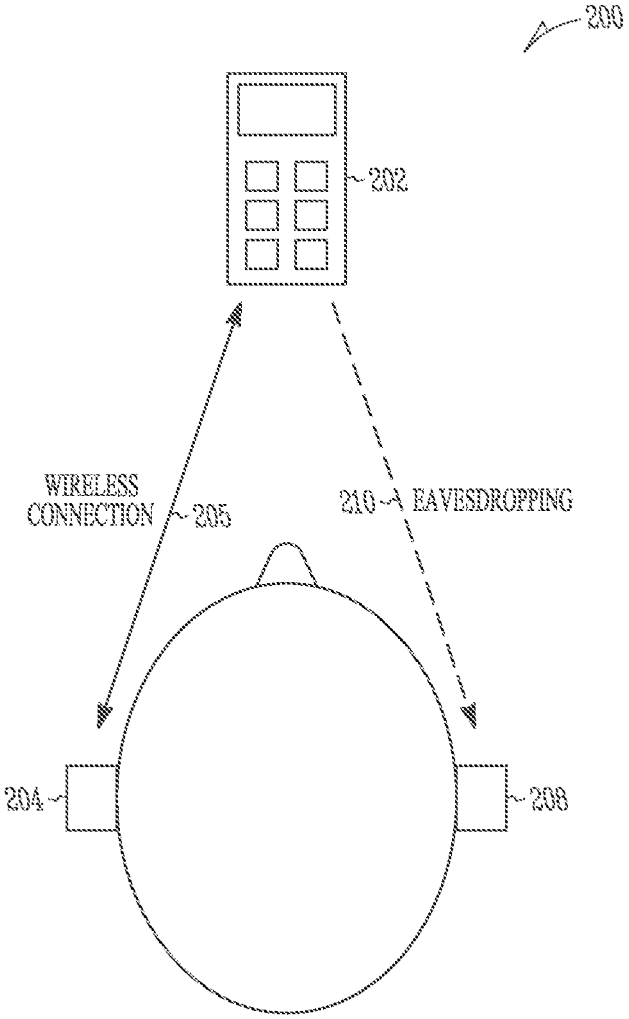
FIG. 2 shows one application using wireless devices in an eavesdropping communication mode according to one embodiment of the present subject matter.

The system in various embodiments can also support eavesdropping modes. For example, as shown in FIG. 2, in system 200 remote source 202 is in communications with first hearing communication device 204 via signals 205. Second hearing communication device 208 can “listen in” on communications from remote source 202 using a mode that is different than the mode used by the first hearing communication device 204. For instance, it is possible that second hearing communication device 208 receives signals 210, but does not control, for example, handshaking with remote source 202 to the same extent as first communication device 204. Other eavesdropping modes can be employed without departing from the scope of the present subject matter.

Figure 3:
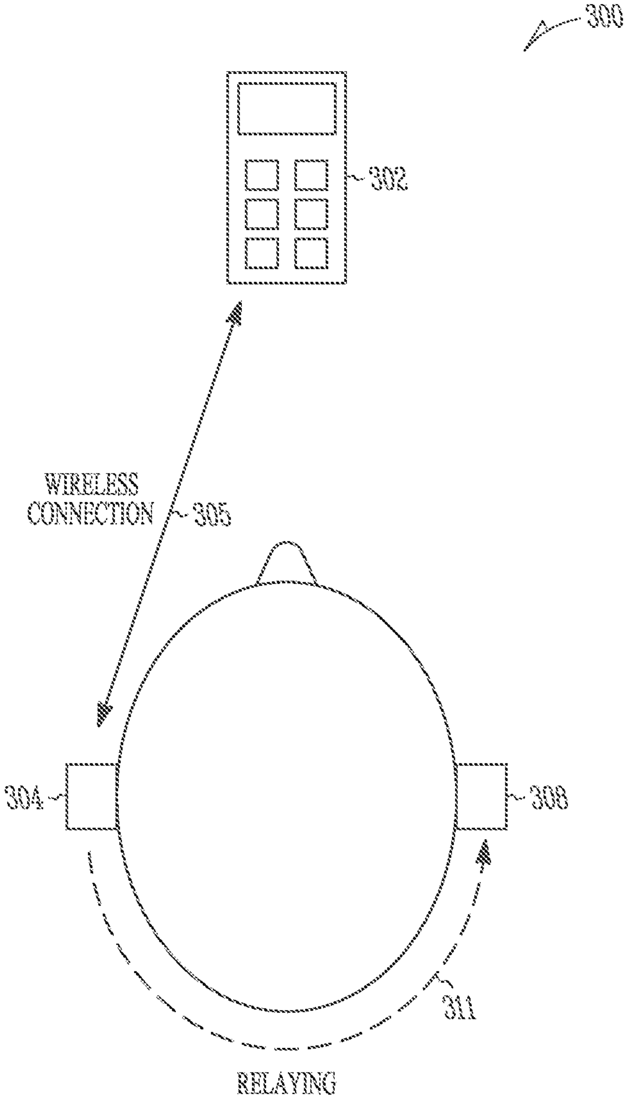
FIG. 3 shows one application using wireless devices in a relaying communication mode according to one embodiment of the present subject matter.

FIG. 3 depicts one embodiment where a relaying mode is employed to communicate wirelessly between the first hearing communication device 304 and the second hearing communication device 308. In this embodiment, first and second audio information is sent over signal 305 to the first hearing communication device 304. The second audio information is then relayed to the second hearing communication device 308 via relay signal 311. Such relay may be performed using different frequencies, different communication modes and with different data rates, for different implementations if desired. In one embodiment, the first hearing communication device 304 may demodulate and decode stereo information and encode and relay the channel bound for the instrument on or in the other ear. In various embodiments, the communications can be made using similar transmissions to the primary transmission. In various embodiments, the communications can be maded using a different method than that of the primary transmission. In various embodiments, the signals 305 and 311 are unidirectional. In various embodiments, the signals 305 and 311 are bidirectional. In various embodiments, the signals 305 and 311 are programmably combinations of unidirectional and/or bidirectional. Thus, the system 300 is highly programmable to adapt to a number of communication requirements and applications. In one embodiment, relay signal 311 is a substantially magnetically coupled or near field communication link. In one embodiment, a telecoil is employed to receive the relay signal 311. In one embodiment, a magnetic sensor is used to receive the relay signal 311. In one embodiment, relay signal 311 is a radio frequency or far field communication link. Other communication links, such as infrared and ultrasonic may be employed in various applications.

In the various embodiments and applications provided herein, different communications electronics are used by the systems (e.g., 100, 200, 300) to provide different communication modes for the stereo information. For example, in one embodiment a first channel and a second channel are employed to communicate the stereo information to the first and second ears, respectively. In one embodiment, the electronics includes frequency division multiplexed communications electronics. In one embodiment, the electronics includes time division multiplexed communications electronics. In one embodiment, the electronics includes code division multiplexed communications electronics. In one embodiment, the electronics includes packetized communications electronics. In one embodiment, the electronics includes analog communications electronics. In one embodiment, the electronics includes frequency modulated communications electronics. In one embodiment, the electronics includes single sideband communications electronics. In one embodiment, the electronics includes amplitude modulated communications electronics. In one embodiment, the electronics includes phase modulated communications electronics. Other modulation and communications embodiments are within the scope of the present subject matter and those examples provided herein are intended to demonstrate the flexibility and adaptability of the present subject matter.

The systems (e.g., 100, 200, and 300) in various embodiments can also support communications modes where the first audio information and the second audio information are the same or substantially the same audio information.

In various embodiments, the remote source (e.g., 102, 202, and 302) supports one or more communication protocols. In various embodiments, communications of far field signals are supported. Some embodiments employ 2.4 GHz communications. In various embodiments the wireless communications can include standard or nonstandard communications. Some examples of standard wireless communications include, but are not limited to, FM, AM, SSB, BLUETOOTH™, IEEE 802.11 (wireless LANs) wi-fi, 802.15 (WPANs), 802.16 (WiMAX), 802.20, and cellular protocols including, but not limited to CDMA (code division multiple access) and GSM, ZigBee, and ultra-wideband (UWB) technologies. Such protocols support radio frequency communications and some support infrared communications. Other available forms of wireless communications include ultrasonic, optical, and others. It is understood that the standards which can be used include past and present standards. It is also contemplated that future versions of these standards and new future standards may be employed without departing from the scope of the present subject matter.

Such remote sources (e.g., 102, 202, and 302) include, but are not limited to, cellular telephones, personal digital assistants, personal computers, streaming audio devices, wide area network devices, local area network devices, personal area network devices, and remote microphones. In various embodiments, the remote source includes one or more of the interface embodiments demonstrated in U.S. Provisional Patent Application Ser. No. 60/687,707, filed Jun. 5, 2005, entitled: COMMUNICATION SYSTEM FOR WIRELESS AUDIO DEVICES, and U.S. patent application Ser. No. 11/447,617, filed Jun. 5, 2006, entitled: COMMUNICATION SYSTEM FOR WIRELESS AUDIO DEVICES which claims the benefit of the provisional application the entire disclosures of which are hereby incorporated by reference. In various embodiments, one or more of the hearing communication devices use the radio technology provided in Provisional Patent Application Ser. No. 60/687,707, and U.S. patent application Ser. No. 11/447,617, both of which are incorporated by reference in their entirety. In various embodiments a low power system is provided to allow communications between the remote sources and one or more hearing communication devices.

In the embodiments demonstrated herein, the listener has first and second hearing communication devices. In various embodiments, such devices include, but are not limited to, various types of hearing aids. In one embodiment, at least one wireless hearing assistance device is a behind-the-ear hearing aid. In one embodiment, at least one wireless hearing assistance device is an in-the-ear hearing aid. In one embodiment, at least one wireless hearing assistance device is a completely-in-the-canal hearing aid. In one embodiment, at least one wireless hearing assistance device is a wireless earpiece. Various examples of wireless adapters for some hearing assistance devices using a direct-audio input (DAI) interface are demonstrated in U.S. patent application Ser. No. 11/207,591, filed Aug. 18, 2005, entitled "WIRELESS COMMUNICATIONS ADAPTER FOR A HEARING ASSISTANCE DEVICE;" and PCT Patent Application No. PCT/US2005/029971, filed Aug. 18, 2005, entitled "WIRELESS COMMUNICATIONS ADAPTER FOR A HEARING ASSISTANCE DEVICE," the entire disclosures of which are incorporated by reference.

The wireless hearing communication devices can contain a microphone to receive sounds. Some examples include a microphone for reception of ambient sound, which can be encoded and transmitted by the wireless hearing assistance device. Another example is a microphone adapted for reception of speech by the wearer of the device. The speech can be encoded and transmitted by the wireless hearing assistance device. It is understood that in certain embodiments, the wireless hearing communication devices may be wireless hearing assistance devices. One type of hearing assistance device is a hearing aid. Other wireless communication devices may be employed having various information to communicate. Thus, the devices can support bidirectional communication modes.

In various embodiments, the communications between the remote source and one or more wireless communication devices are unidirectional. In various embodiments, the communications between the remote source and one or more wireless communication devices are bidirectional. In various embodiments, the communications include at least one unidirectional communication and one bidirectional communication. Thus, the system is highly programmable to adapt to a number of communication requirements and applications. In relaying embodiments, it is understood that the communications can be unidirectional or bidirectional.

It is understood that the examples set forth herein can be applied to a variety of wireless devices and primary and secondary device combinations. Thus, the examples set forth herein are not limited to cell phone applications.

This description has set forth numerous characteristics and advantages of various embodiments and details of structure and function of various embodiments, but is intended to be illustrative and not intended in an exclusive or exhaustive sense. Changes in detail, material and management of parts, order of process and design may occur without departing from the scope of the appended claims and their legal equivalents.

What is claimed is:

1. A system, comprising:

a first ear-wearable device configured to receive wireless communications from a remote source, the first ear-wearable device configured to provide a first audio signal to a first ear of a wearer, wherein the first audio signal is derived from the wireless communications; and a second ear-wearable device configured to provide a second audio signal to a second ear of the wearer, wherein the second audio signal is derived from the wireless communications, wherein the system includes at least two programmable communication modes for the second ear-wearable device to obtain at least some of the wireless communications, the at least two programmable communication modes including an eavesdropping mode and a relaying mode.

2. The system of claim 1, wherein the at least two programmable communication modes further includes a direct mode in which the second ear-wearable device receives the wireless communications directly from the remote device.

3. The system of claim 1, wherein the relaying mode includes the second ear-wearable device using wireless communications electronics to receive a relay signal from the first ear-wearable device.

4. The system of claim 3, wherein the relay signal includes stereo audio information.

5. The system of claim 3, wherein the wireless communications electronics include a near-field communications electronics.

6. The system of claim 3, wherein the wireless communications electronics include frequency division multiplexed communications electronics.

7. The system of claim 3, wherein the wireless communications electronics include time division multiplexed communications electronics.

8. The system of claim 3, wherein the wireless communications electronics include code division multiplexed communications electronics.

9. The system of claim 3, wherein the wireless communications electronics include packetized communications electronics.

10. The system of claim 3, wherein the wireless communications electronics include analog communications electronics.

11. The system of claim 3, wherein the wireless communications electronics include frequency modulated communications electronics.

12. The system of claim 3, wherein the wireless communications electronics include single sideband communications electronics.

13. The system of claim 3, wherein the wireless communications electronics include amplitude modulated communications electronics.

14. The system of claim 3, wherein the wireless communications electronics include phase modulated communications electronics.

15. A method, comprising:

receiving wireless communications from a remote source at a first ear-wearable device configured to provide a first audio signal to a first ear of a wearer, wherein the first audio signal is derived from the wireless communications; and obtaining at least some of the wireless communications at a second car-wearable device using a communication mode selected from at least two programmable communication modes, the second ear-wearable device configured to provide a second audio signal to a second ear of the wearer, wherein the second audio signal is derived from the wireless communications, wherein the at least two programmable communication modes include an eavesdropping mode and a relaying mode.

16. The method of claim 15, wherein the at least two programmable communication modes further includes a direct mode in which the second ear-wearable device receives the wireless communications directly from the remote device.

17. The method of claim 15, wherein the first ear-wearable device controls handshaking with the remote source.

18. The method of claim 17, wherein the second ear-wearable device does not control handshaking with the remote source to the same extent as the first ear-wearable device.

19. The method of claim 15, wherein at least one of the first ear-wearable device and the second ear-wearable device is a hearing aid.

20. The method of claim 15, wherein the remote source includes one or more of a cellular telephone, a personal computer, or a streaming audio device.

* * * * *